(12) United States Patent
Emmanuel et al.

(10) Patent No.: US 8,824,588 B2
(45) Date of Patent: Sep. 2, 2014

(54) NEAR-FIELD MIMO WIRELESS TRANSMIT POWER MEASUREMENT TEST SYSTEMS, STRUCTURES, AND PROCESSES

(71) Applicant: Netgear, Inc., San Jose, CA (US)

(72) Inventors: Joseph Amalan Arul Emmanuel, Cupertino, CA (US); Jonathan M. Hummel, Indio, CA (US)

(73) Assignee: Netgear, Inc., San Jose, CA (US)

( * ) Notice: Subject to any disclaimer, the term of this patent is extended or adjusted under 35 U.S.C. 154(b) by 0 days.

(21) Appl. No.: 13/710,250

(22) Filed: Dec. 10, 2012

(65) Prior Publication Data

US 2014/0161164 A1    Jun. 12, 2014

(51) Int. Cl.
H04B 7/02    (2006.01)

(52) U.S. Cl.
USPC ........... 375/267; 375/316; 375/224; 375/295; 375/228; 455/115; 455/423; 455/115.1; 455/115.3; 455/425; 455/424; 455/67.11; 455/115.4; 455/66.1; 455/67.12; 455/67.14; 455/68

(58) Field of Classification Search
USPC .......... 375/316, 224, 295, 228, 267; 455/115, 455/423, 115.1, 115.3, 425, 424, 67.11, 455/115.4, 66.1, 67.12, 67.14, 68
See application file for complete search history.

(56) References Cited

U.S. PATENT DOCUMENTS 7,925,253 B2 *   4/2011   Breit et al. .................... 455/425
8,743,705 B2     6/2014   Holman et al.
2002/0091966 A1*  7/2002   Barton et al. ..................... 714/25
2007/0243826 A1  10/2007   Liu
2010/0285753 A1* 11/2010   Foegelle ..................... 455/67.12
2011/0084887 A1*  4/2011   Mow et al. ..................... 343/703
2011/0230143 A1   9/2011   Lundstrom et al.
2011/0263215 A1  10/2011   Asplund et al.
2012/0039178 A1   2/2012   Holman et al.
2012/0100813 A1*  4/2012   Mow et al. ................. 455/67.12
2012/0244818 A1*  9/2012   Kyosti et al. ............... 455/67.13
2013/0027256 A1*  1/2013   Guo et al. ..................... 343/703
2013/0257454 A1  10/2013   Mow et al.

OTHER PUBLICATIONS

"AMS-8700 MIMO OTA Test System", ETS-Lindgren; retrieved online on Nov. 30, 2012 from url: https://www.ets-lindgren.com/MIMOWirelessTestSystem, 2 pages.
Azimuth Systems, , "MIMA OTA Test, Over-the-Air Test: Real World Performance Measurement", retrieved online on Nov. 30, 2012 from url: http://www.azimuthsystems.com/products/rpm/, 2 pages.
IEEE Standards Department, Draft Recommended Practice for the Evaluation of 802.11 Wireless Performance; IEEE P802.11tm/D0.10, copyright 2005, 2006, 180 Pages.

(Continued)

*Primary Examiner* — Siu Lee
(74) *Attorney, Agent, or Firm* — Michael A. Glenn; Perkins Coie LLP

(57) ABSTRACT

Systems, processes, and structures provide near-field transmit power measurement for MIMO wireless devices (DUT), such as for any of product development, product verification, and/or production testing. A test signal, such as comprising a pulse train signal, is provided to a MIMO device under test (DUT), wherein portions of the test signal controllably steered and sequentially transmitted from each of the device antennas, to one or more test antennas that are positioned in close proximity to the MIMO DUT. The near-field power of the received test signals is measured, to quickly and efficiently determine if one or more data streams of the MIMO DUT has a problem.

24 Claims, 15 Drawing Sheets

(56) References Cited

OTHER PUBLICATIONS

Mlinarsky, F., "Test MIMO Wi-Fi and LTE radios over the air", Wireless Test; www.tmworld.com; Test & Measurment World, Mar. 28, 2012, 3 pages.

Rohde & Schwarz, , "R&S TS8991 OTA Performance Test System;2012", retrieved online on Nov. 30, 2012 at url: http://www2.rohde-schwarz.com/en/products/test_and_measurement/mobile_radio/TS8991-%7C-Overview-%7C-100-%7C-6539.html, unknown, 2 pages.

Satimo, , "StarMIMO-HU", retrieved online on Nov. 30, 2012 at http://www.satimo.com/content/products/starmimo-hu, unknown, 1 page.

\* cited by examiner

NEAR-FIELD MIMO WIRELESS TRANSMIT POWER MEASUREMENT TEST SYSTEMS, STRUCTURES, AND PROCESSES

BACKGROUND OF THE INVENTION

1. Technical Field

The invention relates generally to testing structures and processes for wireless or RF (radio frequency) communications systems. More particularly, the invention relates to structures and processes that provide near-field transmit power measurement of MIMO wireless devices and systems.

2. Description of the Background Art

Single-input single-output (SISO) wireless devices have been developed and implemented for many years, to transmit and/or receive desired signals to/from other elements, to provide wireless connectivity and communication between devices in a wireless network, such as in a wireless PAN (personal area network), a wireless LAN (local area network) a wireless WAN (wide area network), a cellular network, or virtually any other radio network or system. Such SISO devices may operate over a wide variety of frequency bands, such as but not limited to 2.4 GHz and 5.0 GHz bands. Test systems and standardized test models have also been developed and implemented over the years for SISO wireless devices.

However, the growing demand for increased bandwidth, i.e. requirements for increased data transfer, has driven the development of multiple-input multiple output (MIMO) devices.

In production testing environments, the overall cost per unit decreases as the time required to test each of the units is decreased. However, a decrease in the time to test each unit should not compromise the quality of the test results, which may otherwise result in a higher percentage of product failures that necessitate any of product returns or product repairs.

While numerous systems and standardized models have been developed for the testing of SISO devices, there are currently no standard systems and models to adequately test the entire range of parameters that constitute the performance of multiple-input multiple output (MIMO) devices.

For example, there are currently no standard systems and models to efficiently test the near-field transmit power measurement of multiple-input multiple output (MIMO) devices.

It would therefore be advantageous to provide a system, structure and method that provide adequate near-field transmit power measurement for MIMO devices for a variety of operating conditions. Such a system and process would constitute a major technological advance.

SUMMARY OF THE INVENTION

Systems, processes, and structures provide near-field transmit power measurement for MIMO wireless devices (DUT), such as for any of product development, product verification, and/or production testing. A test signal, such as comprising a pulse train signal, is provided to a MIMO device under test (DUT), wherein portions of the test signal controllably steered and sequentially transmitted from each of the device antennas, to one or more test antennas that are positioned in close proximity to the MIMO DUT. The near-field power of the received test signals is measured, to quickly and efficiently determine if one or more data streams of the MIMO DUT has a problem.

DETAILED DESCRIPTION OF THE INVENTION

Figure 1:
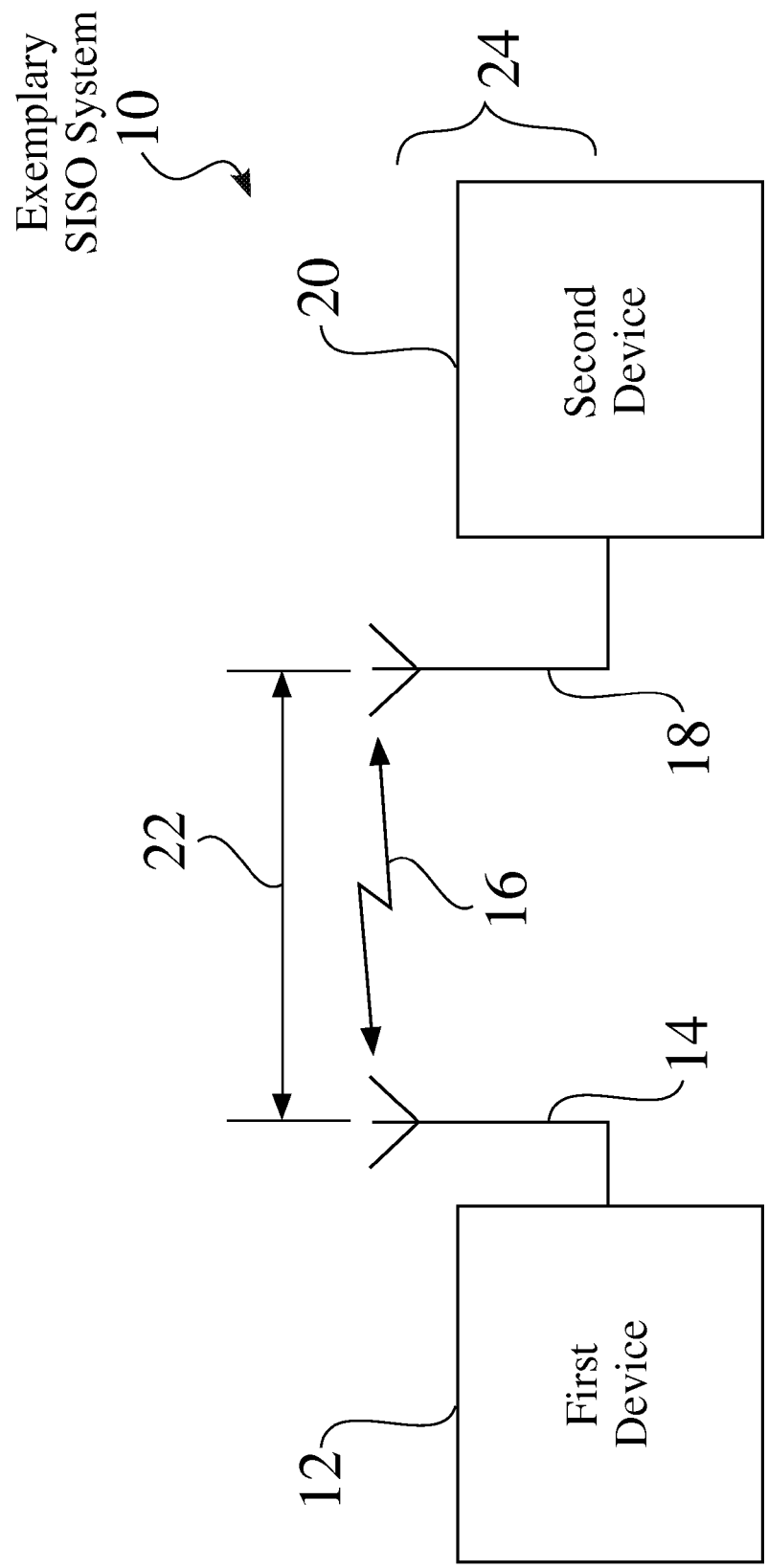
FIG. 1 is a schematic view of an exemplary SISO system.

FIG. 1 is a simplified schematic view of an exemplary single input, single output (SISO) system 10. A first device 12, e.g. a transmitter 12, transmits a wireless signal 16 from an antenna 14. The wireless signal 16 is received at an antenna 18 associated with a second, receiving device 20, which processes the signal 16, such as using signal processing circuitry and a microprocessor. Both the transmitter 12 and the receiver 16 in the SISO system 10 seen in FIG. 1 have a single antenna 14,18, and operate to either send or receive a single signal 16.

In the exemplary SISO system 10 seen in FIG. 1, one or both of the devices 12, 20 may be moved in relation to the other device 20,12, such that the distance 22 between the antennas 14,18 may vary, such as between transmissions of wireless signals 16, and/or during a transmission of a wireless signal 16. While the distance 22 changes the time of flight of the wireless signal 16, the second device 20 can still receive and process the signal 16, as long as the signal 16 is not lost, e.g. such as from but not limited to path loss, i.e. path attenuation. Path loss may occur from a wide variety of conditions, such as but not limited to any of distance, reflection, refraction, diffraction, and/or absorption.

The performance of different SISO devices has readily been performed for many years, such as during any of design, development and production. Such testing may readily be performed at any distance 22, e.g. at any range between near-field and far-field. As SISO devices 12,20 comprise a single SISO path 24, to send and/or receive a single wireless signal 16, there is inherently no difference due to distance, other than general signal attenuation.

Figure 2:
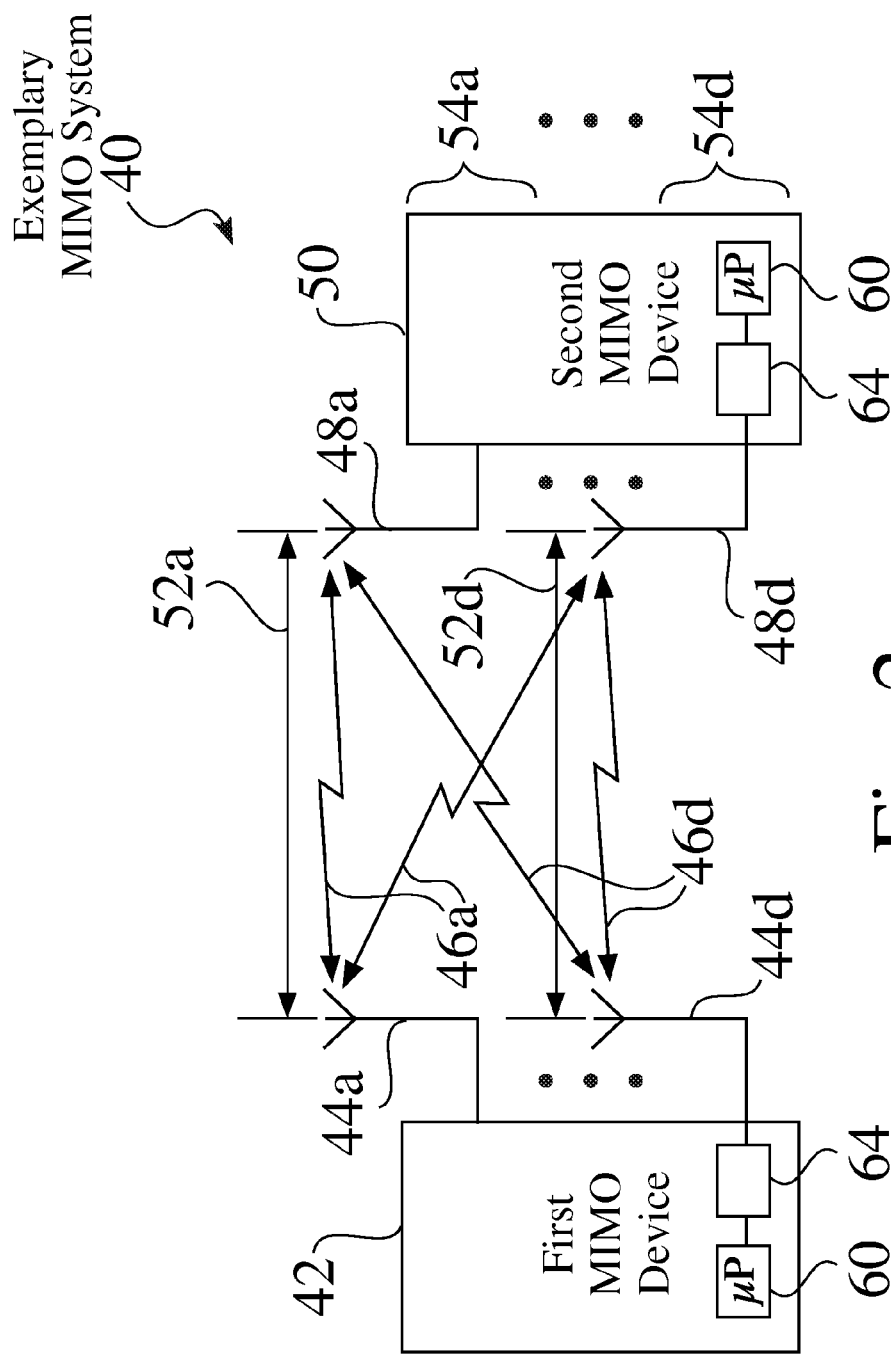
FIG. 2 is a schematic view of an exemplary MIMO system.

In contrast to the SISO system 10 seen in FIG. 1, FIG. 2 is a simplified schematic view of an exemplary multiple-input multiple-output (MIMO) system 40. A first MIMO device 42 transmits a plurality of wireless signals 46, e.g. 46a-46d from respective antennas 44, e.g. 44a-44d. The wireless signals 46 e.g. 46a-46d are typically received at a corresponding plurality of antennas 48, e.g. 48a-48d, associated with a second MIMO device 50, which processes the signals 46a-46n, such as using signal processing circuitry 64 and at least one microprocessor 60. Both MIMO devices 42,50 in the MIMO system 40 seen in FIG. 2 have a plurality of antennas 44,48, wherein the devices are configured to send or receive a plurality of signals 46, e.g. 46a-46d.

In the exemplary MIMO system 40 seen in FIG. 2, one or both of the devices 42,50 may be moved in relation to the other device 50,42, such that the distance 52, 52a-52d, between antennas 44,48 may vary, such as between transmissions of wireless signals 46, and/or during a transmission of a wireless signal 46. While the distance 52 changes the time of flight of the wireless signal 46, the receiving device 50 can still receive and process the signals 46, e.g. 46a-46n, as long as the signals 46 are not lost, e.g. such as from but not limited to path loss, i.e. path attenuation. Path loss may occur from a wide variety of conditions, such as but not limited to any of distance, reflection, refraction, diffraction, and/or absorption.

In contrast to SISO devices, e.g. 12, 20, the performance of MIMO devices, e.g. 42,50 is uniquely dependent on the simultaneous transmission of a plurality of signals 46 over a plurality of MIMO transmission (Tx) paths or chains 54, e.g. 54a-54d, as well as on the distance 52, e.g. 52a-52d. For example, in a simplified MIMO system having two Tx paths 54a and 54d, each device 42,50 comprises two radio Tx paths 54 that are independent of each other. However, at the receiving end, each antenna 48a and 48d receives a composite signal 46a and 46d that includes the data from both signals 46a and 46d, e.g. "Data A" from a first signal 46a, and "Data B" from a second signal 46d, is received and "Data A plus B" at antennas 48a and 48d. Therefore, the receiver 50 is required to process the signals 46a and 46d to split the data, based on each corresponding Tx path 54a and 54d, to recapture the data, e.g. "Data A" at the first Tx path 54a and "Data B" at the second Tx path 54d, and prevent interference between the Tx paths 54a and 54d.

Since the plurality of signals 46a and 46d are transmitted simultaneously in a MIMO system 40, the bandwidth is increased, e.g. such as to double the bandwidth as compared to an equivalent SISO system 10. Similarly, the addition of more Tx paths, e.g. Three by Three (3×3) or Four by Four (4×4) MIMO systems 40, provides increased bandwidth, along with further processing requirements, to split the combined and summed signals for the plurality of Tx paths 54a-54d.

It is important to avoid interference and/or cancellation between Tx paths 54a-54d, since the signals 46a-46d typically have the same frequency and amplitude. As well, since the receiving device, e.g. 50, receives each of the plurality of signals, e.g. 46a and 46d, simultaneously, the receiving device, e.g. 50, cannot identify which signal 46 is coming from which antenna 44, e.g. 44a or 44d.

Signal processing for the transmission and/or reception of MIMO signals 46 is typically performed by one or more processors 60 (FIG. 2), i.e. chipsets 60 in the MIMO devices 42,50, wherein independent chipset vendors, commonly provide the chipsets, and all internal blocks.

Near-Field SISO Power Measurement Structures, Systems, and Processes.

Figure 3:
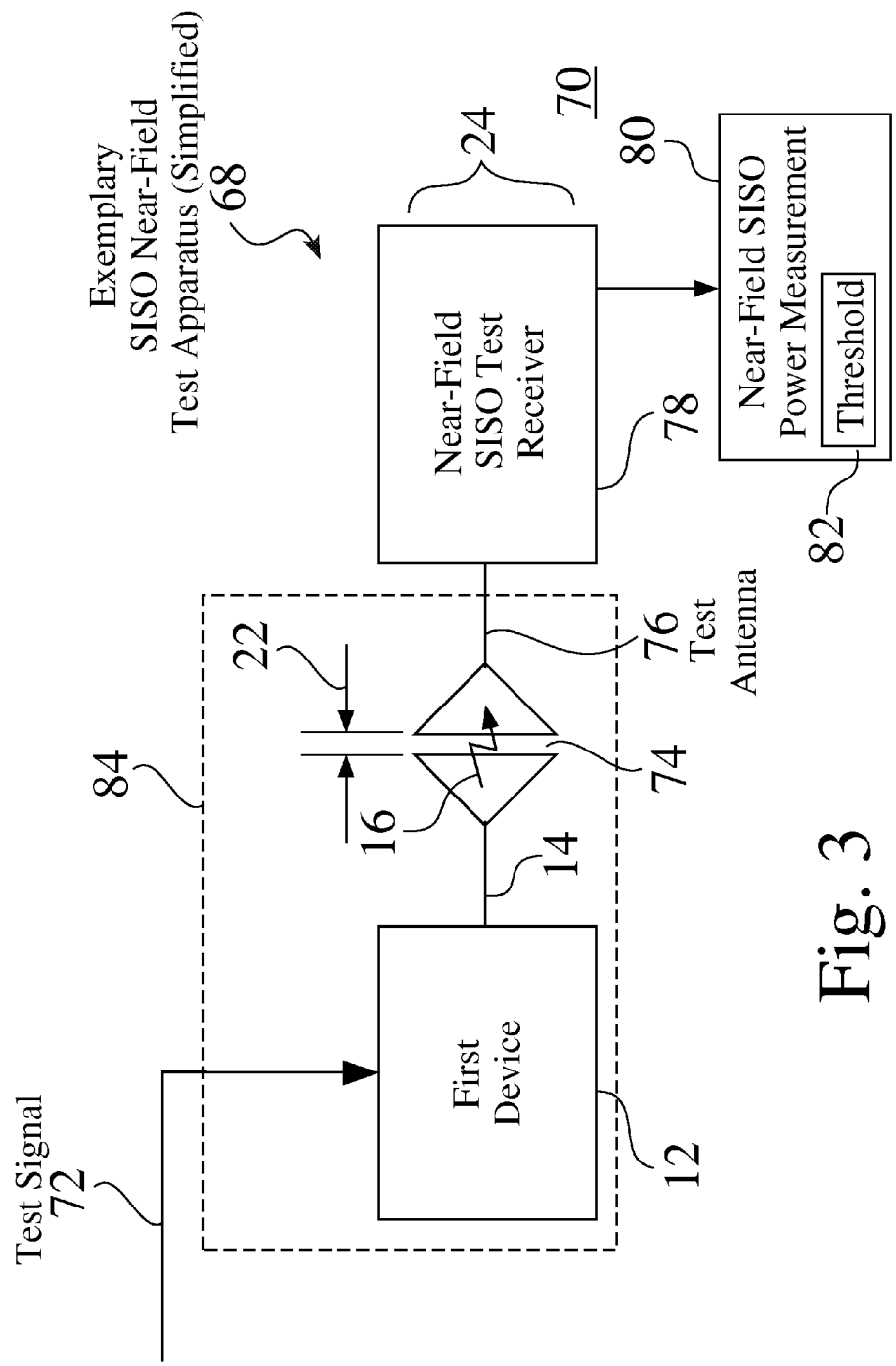
FIG. 3 is a simplified schematic view of an exemplary apparatus for measuring the output power of a SISO device.

FIG. 3 is a simplified schematic view 68 of an exemplary power measurement apparatus 70 for measuring the output power of an exemplary single input single output (SISO) wireless communications device under test (DUT), e.g. 12.

As seen in FIG. 3, an exemplary SISO device 12 may be placed within a test chamber or region 84, and positioned 74 such that the SISO antenna 14 is closely aligned and spaced 22 with respect to a SISO test antenna 76. For example, the antenna 14 for a SISO device under test 12 may be spaced 22 within about 10 mm from a test antenna 76. The SISO test antenna 76 is connected to a near-field SISO test receiver 78.

The near-field power 124 (FIG. 5) of the SISO device under test (DUT) 12 may then be measured, such as to determine if there are problems within the SISO DUT 12. A test signal 72 is fed into the SISO DUT 12, wherein the test signal 72 may comprise a signal pulse. The test signal 72 is processed through the SISO DUT 12, and transmitted 16 from the SISO DUT antenna 14.

The transmitted SISO signal 16 is received through the test antenna 76 and the SISO test receiver 78, wherein the power of the received signal 16 is measured 80. Based upon the reception of the transmitted signal 16, or not, and the measured power 80, such as compared to a threshold level, the SISO DUT 12 is either passed, e.g. if the signal is received and the power level 80 meets or exceeds an acceptable threshold level 82, or fails, e.g. if the signal 16 is not received, or is received, but the power level 80 falls below the acceptable threshold level 82.

For example, a SISO DUT 12 may normally be configured to transmit an output signal 16 at about +10 decibel (dB), such that the transmitted signal 16 may normally be received at about 0 dB. However, if there is an internal problem with the SISO DUT 12, such as but not limited to a disconnected or broken cable within the device 12, the SISO DUT 12 may either fail to transmit a signal 16, or the power 80 of the received signal 16 may be significantly attenuated e.g. such as indicated by a received power level of −20 dB. In this example, an exemplary stored threshold level 82 of about minus 10 dB may be compared to the measured near-field power level, to indicate that the SISO DUT 12 has failed the near-field power measurement test.

Near-field power measurement testing can be quickly and efficiently performed, to determine a wide range of possible problems in SISO devices, e.g. 12, which may otherwise be overlooked in other system-wide tests that may otherwise mask such problems, if the test system or other operating environment compensates for path losses of about 10 to 20 dB.

Near-Field MIMO Power Measurement Structures, Systems, and Processes.

Figure 4:
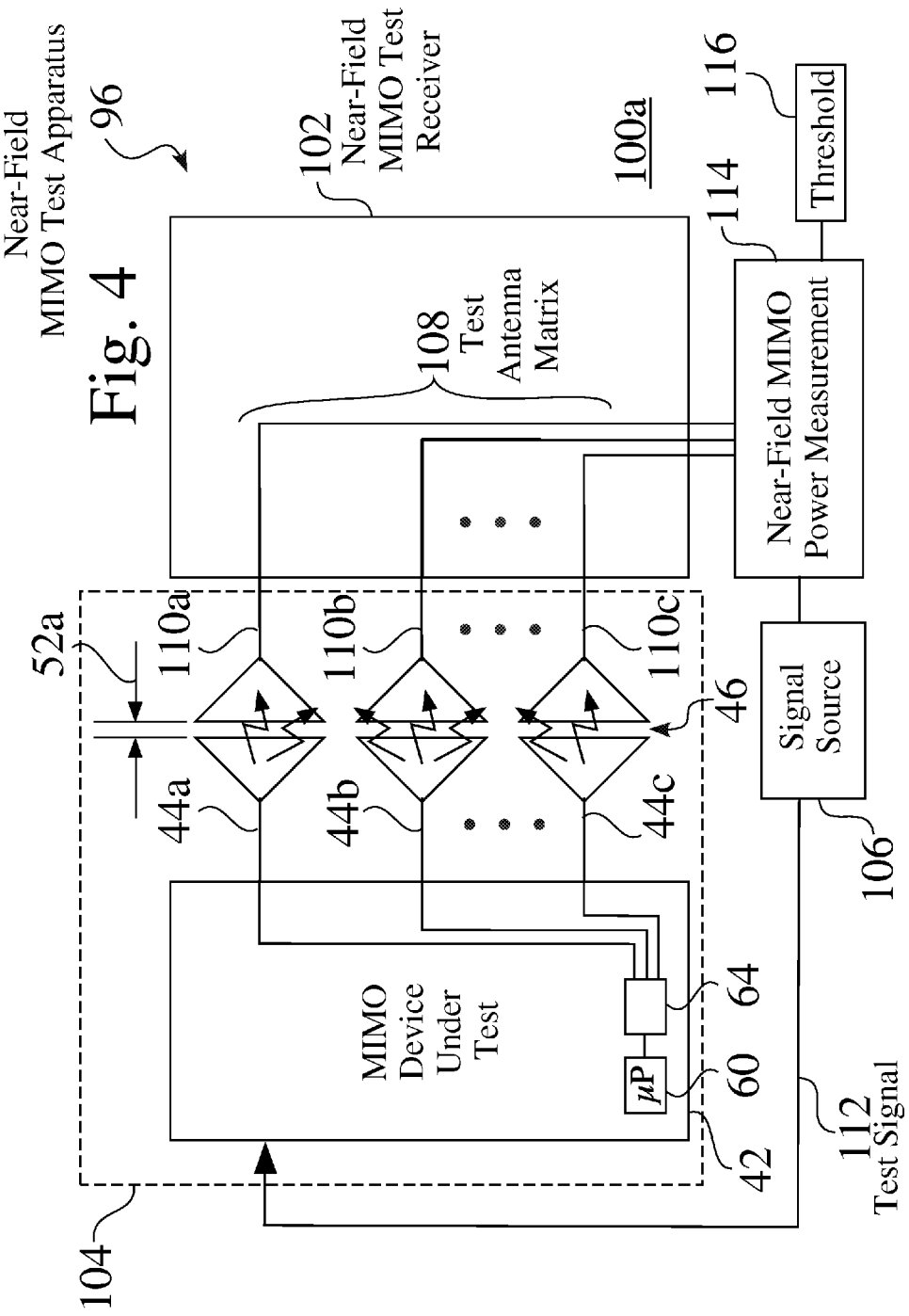
FIG. 4 is a simplified schematic view of an exemplary apparatus for measuring the output power of a MIMO device.
Figure 5:
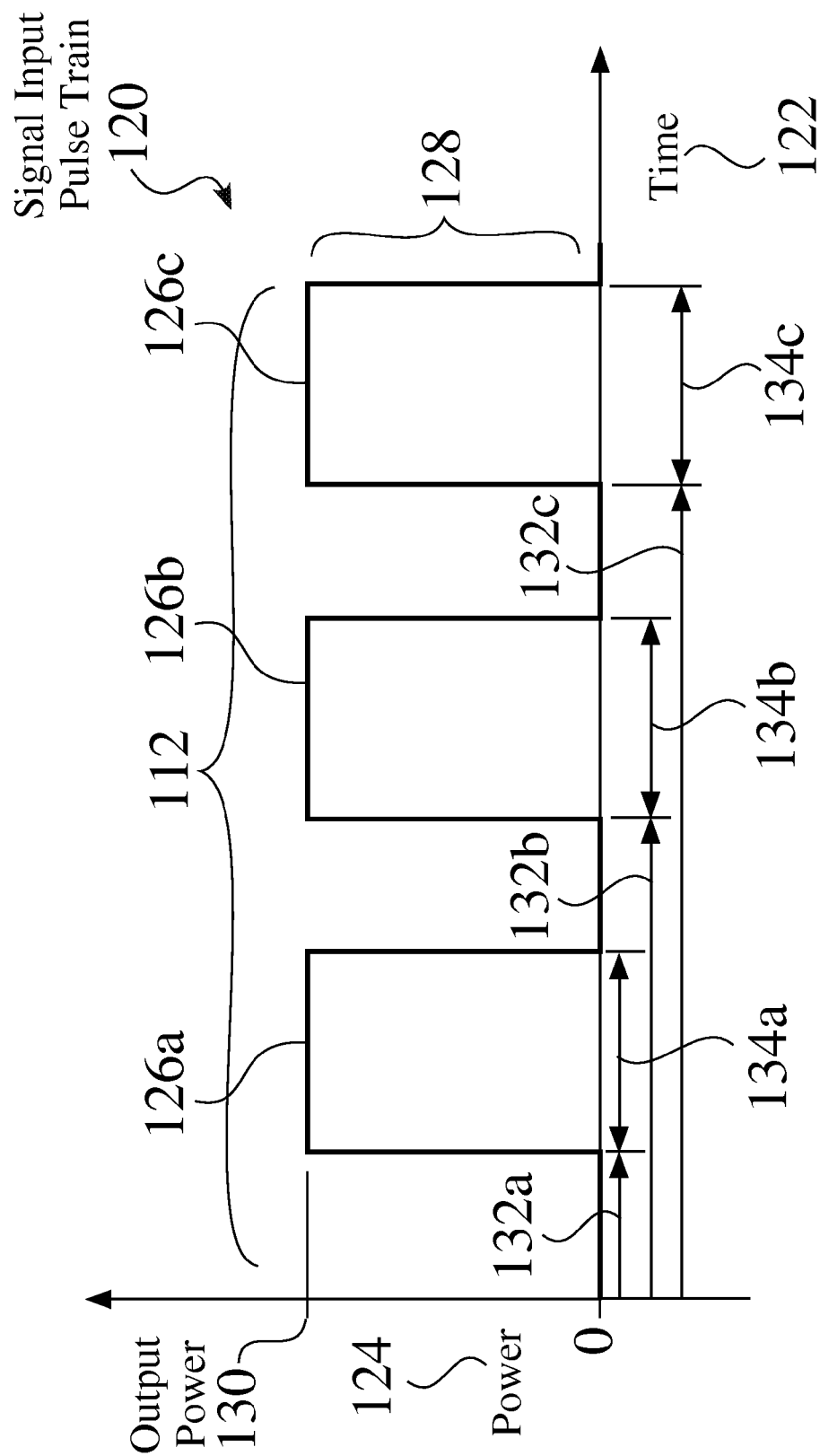
FIG. 5 is a schematic view of an exemplary test pulse train signal for near-field power measurement of a MIMO device.

FIG. 4 is a simplified schematic view 96 of an exemplary MIMO test system 100, e.g. 100a, for measuring the near-field output power of an exemplary multiple input multiple output (MIMO) wireless communications device under test (DUT), e.g. 42. FIG. 5 is a schematic view 120 of an exemplary test signal pulse train 128 for near-field power measurement of an exemplary MIMO device under test (DUT) 42.

As seen in FIG. 4, an exemplary multiple input multiple output (MIMO) device 42 may be placed within a DUT test region 104, e.g. 104a (FIG. 12), such as in relation to a test chamber 302 (FIG. 12), and positioned such that the MIMO antennas 44, e.g. 44a-44c, are closely aligned and spaced 52, e.g. 52a-52c, with respect to one or more corresponding MIMO test antennas 110, e.g. 110a-110c. The matrix 108 of MIMO test antennas 110a-110c is connected to a near-field MIMO test receiver 102. In a current embodiment of the test system 100, the antennas 44a-44c of the MIMO device under test 42 are spaced 52, e.g. 52a-52c, within about 10 mm from corresponding test antennas 110a-110c.

A test signal 112 is fed into the MIMO OUT 12, wherein the MIMO test signal 112 may preferably comprise a signal pulse train 112 (FIG. 5), having a plurality of signal pulses 126, e.g. 126a-126c. The exemplary signal pulse train 128 seen in FIG. 5 comprises a sequential plurality of signal pulses 126a-126a, as a function of power 124 with respect to time 122. For example, the pulses 126a-126c have a characteristic power level 130, a start time 132, e.g. 132a-132c, and a duration 134, e.g. 134a-134c.

The test signal 112 is processed through the MIMO DUT 42, wherein corresponding portions, e.g. 126a, 126b, or 126c, are steered and transmitted 46 from one of the DUT antennas 44a-44c. For example, a corresponding portion, e.g. a first pulse 126a may preferably be transmitted from a first antenna 44a at a first time 122, a second pulse 126b may preferably be transmitted from a second antenna 44b at a second time 122, and a third pulse 126c may preferably be transmitted from a third antenna 44c at a third time 122.

Figure 7:
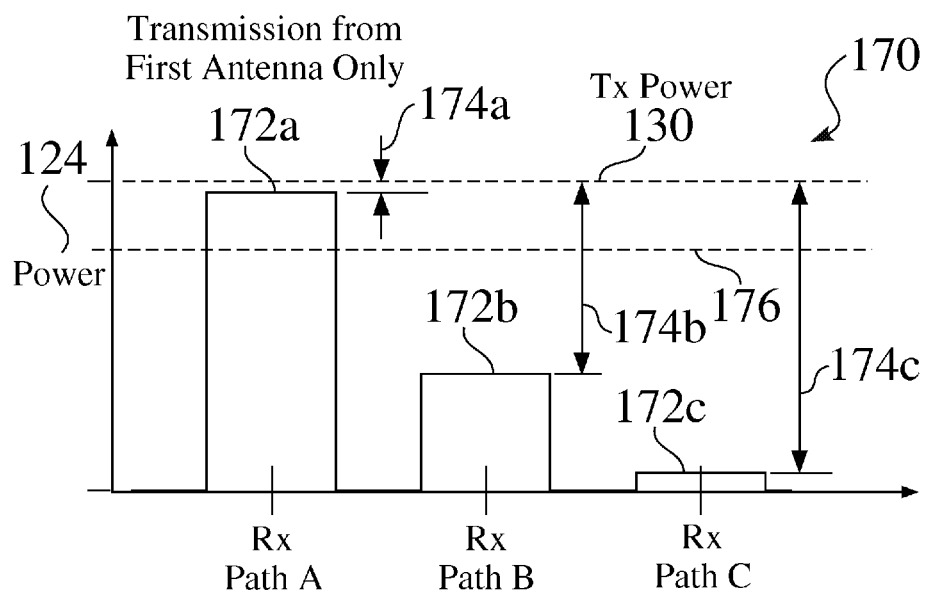
FIG. 7 shows exemplary reception of a first signal for near-field power measurement of a MIMO device.

In the above example, while the first pulse 126a is transmitted from the first antenna 44a, the received near-field power level 124 of the first pulse 126a is higher at the corresponding test antenna 110, e.g. 110a, than the near-field power level 124 for neighboring test antennas 110, e.g. 110b and 110c, due to signal attenuation 174, e.g. 174b, 174c (FIG. 7).

The transmitted MIMO signal 46 is received through the test antennas 110, e.g. 110a-110c, and the near-field MIMO test receiver 102, wherein the power of the received signal 46 is measured 114, for each of the MIMO Tx paths 54, e.g. 54a-54c (FIG. 2). Based upon the near-field reception of the transmitted signal 46, e.g. 46a, or not, and the measured power 114, such as compared to a threshold level 116, the MIMO DUT 42 is either passed, e.g. if the signal is received and the power level meets or exceeds an acceptable threshold level 116, or fails, e.g. if the signal is not received, or is received, but the power level falls below the acceptable threshold level 116. The near-field power 124 (FIG. 5) of the MIMO device under test (DUT) 42 is therefore measured, such as to determine if there are problems within the MIMO DUT 42.

For example, a MIMO DUT 42 may typically be configured to transmit an output signal 46 from one of the MIMO antennas 44, e.g. 44a, at about +10 decibel (dB), such that the transmitted signal 46 may normally be received at about 0 dB from a corresponding test antenna 110, e.g. 110a, and also received with further attenuation at other test antennas 110, e.g. 110b and 110c. However, if there is an internal problem with the MIMO DUT 42, such as but not limited to a disconnected or broken cable within the device, the MIMO DUT 42 may either fail to transmit a signal 46, or the power of the received signal at a corresponding test antenna 110 may be significantly attenuated e.g. such as indicated by a received power level of minus 20 dB. In this example, an exemplary stored threshold level 116 of about minus 10 dB may be compared to the measured near-field power level, to indicate that the MIMO DUT has failed the near-field power measurement test. Upon such a failure, the MIMO DUT 46 may preferably be any of rejected, or reworked and retested.

Near-field power measurement testing can be quickly and efficiently performed, to determine a wide range of possible problems in MIMO devices 42, which may otherwise be overlooked in other system-wide tests that may otherwise mask such problems.

For example, system-wide tests, as well as other operating environments, may readily compensate for path losses of about 10 to 20 dB. If one Tx path or chain 54 in a MIMO device or system is broken or is otherwise malfunctioning, the other paths or chains 54 will typically compensate. Under many operating conditions, such a fault may go undetected. However, under operating conditions that require the full capacity such as problematic MIMO device, e.g. long range operation and/or high traffic, the problematic MIMO device will often be detected.

Figure 6:
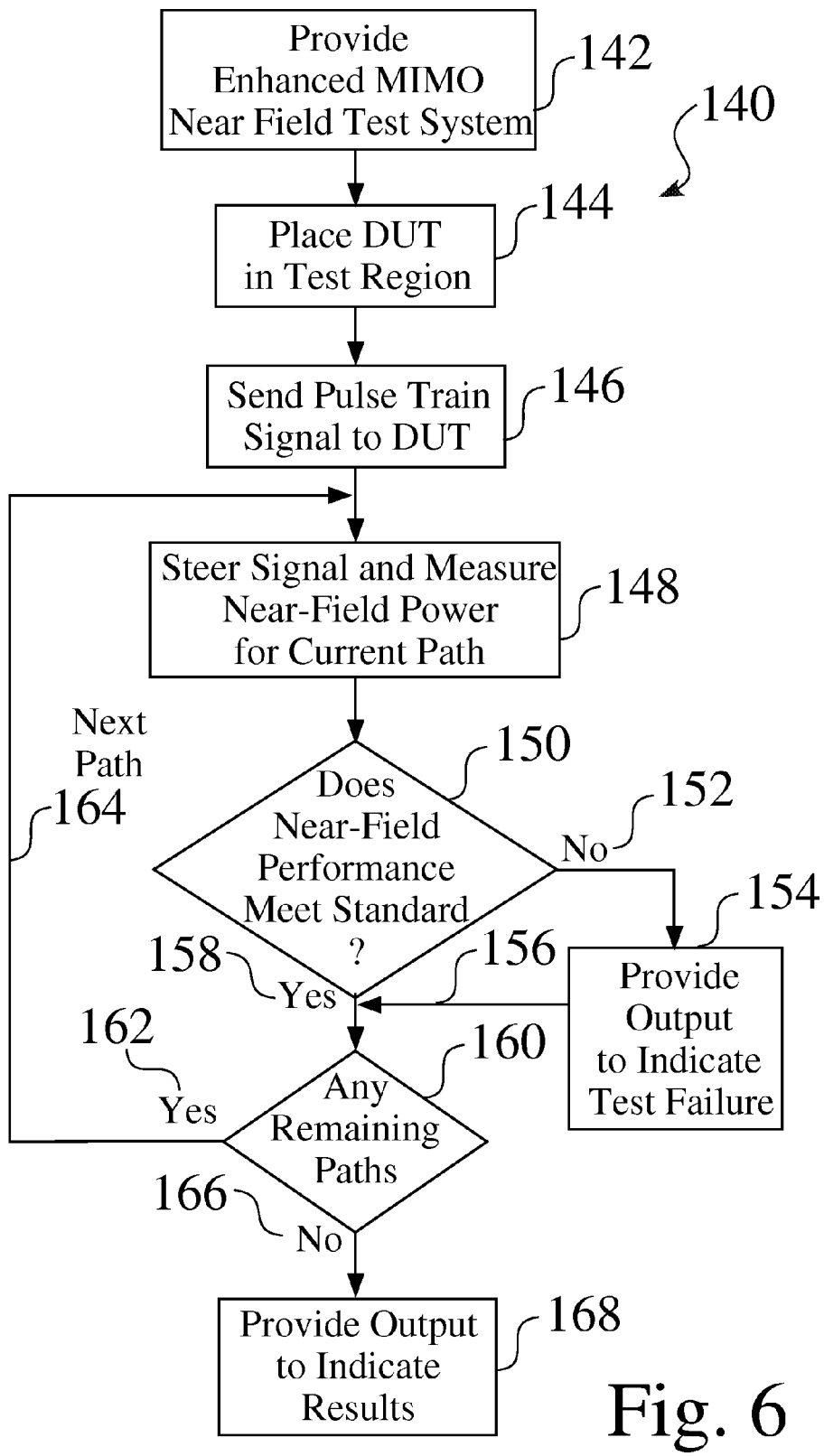
FIG. 6 is a flowchart of an exemplary process for near-field power measurement of a MIMO device.

FIG. 6 is a flowchart of an exemplary process 140 for near-field power measurement of an exemplary MIMO device under test (DUT) 42. At step 142, an enhanced MIMO test system 100, e.g. 100a (FIG. 4), or 100b (FIG. 11), is provided, which is configured to receive and measure the near-field power of uplink signals 46 from one or more MIMO devices under test (DUT) 42.

At step 144, a MIMO device to be tested DUT 42 is placed within a DUT region 104a, e.g. within a test chamber 302 (FIG. 12), and is connected to a power supply and other leads, e.g. such as but not limited to test signal inputs, and/or signal outputs. A test signal 112, such as a pulse train signal 128, is sent to the MIMO DUT 42, at step 146. For each Tx path 54, e.g. 54a-54c, of the MIMO DUT 42, the MIMO DUT 46 is operated to transmit an output, i.e. uplink MIMO signal 46 from one of the MIMO antennas 44, e.g. 44a, wherein the output signal 46 represents a portion of the test signal 112, e.g. a single pulse 126a of the pulse train signal 128, that is steered to one of the corresponding MIMO antennas 46.

The MIMO signal 46 for the current Tx paths 54, e.g. 54a, is then received at the matrix 108 of one or more test antennas 110, e.g. 110a-110c, wherein the near field power 124 is measured 148 for a current Tx path 54, e.g. 54a. At step 150, the system 100 determines if the measured near-field power of the MIMO DUT 46 is acceptable, e.g. such as by comparing the measured near-field power to a threshold 116 (FIG. 4).

If the performance determination 150 is negative 152, such as if the measured near-field power 124 for the tested Tx path 54 does not meet pass-fail criteria, the system 100 may provide an output 154 to indicate the failure, such as but not limited to a printed output, a displayed output, a light, a sound, a database correlation between a DUT identifier and the test result, or other indication.

In some system embodiments 100, such as for prototyping and/or product development or troubleshooting, it may be desirable for a device 46 that fails one test 148,150 to continue 164 to be tested for other Tx paths 54, or to be modified or repaired and retested. In production, further testing may cease if a DUT 46 fails any test, wherein the unit may be any of diverted, tagged, reworked, or rejected.

If the performance determination 150 is positive 158 for the tested Tx path 54, e.g. 54a, such as if the measured near-field power 124 meets pass-fail criteria, a determination 160 may be made whether there are any more remaining tests or Tx paths 54, e.g. 54b and/or 54c, which need to be performed on the DUT 46. If so 162, the process 140 may preferably return 164, e.g. such as to test 148 another Tx path 54. If all tests are completed 166, the system 100 may provide an output 168 to indicate the success, such as but not limited to a printed output, a displayed output, a light, a sound, a database entry, or other indication.

Figure 8:
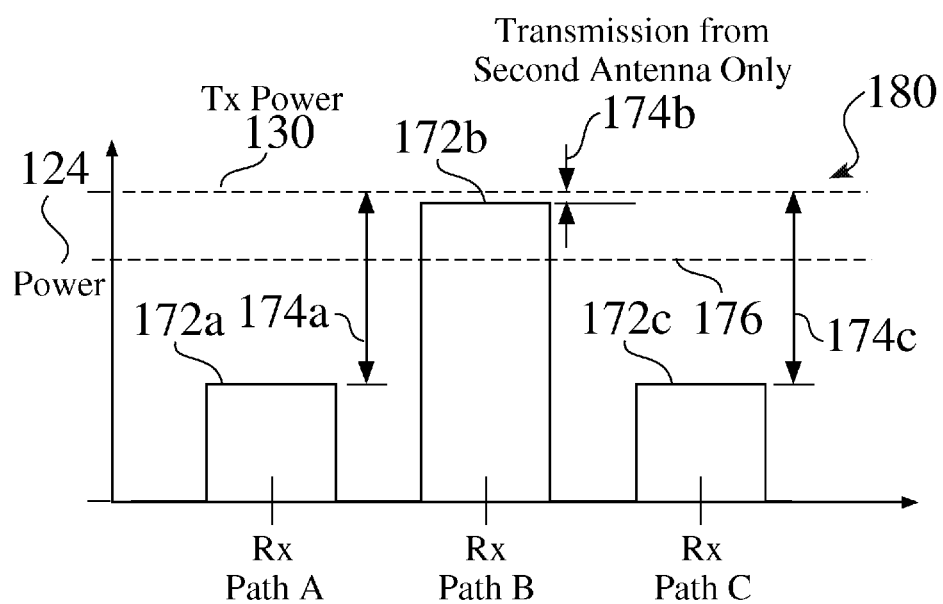
FIG. 8 shows exemplary reception of a second signal for near-field power measurement of a MIMO device.
Figure 9:
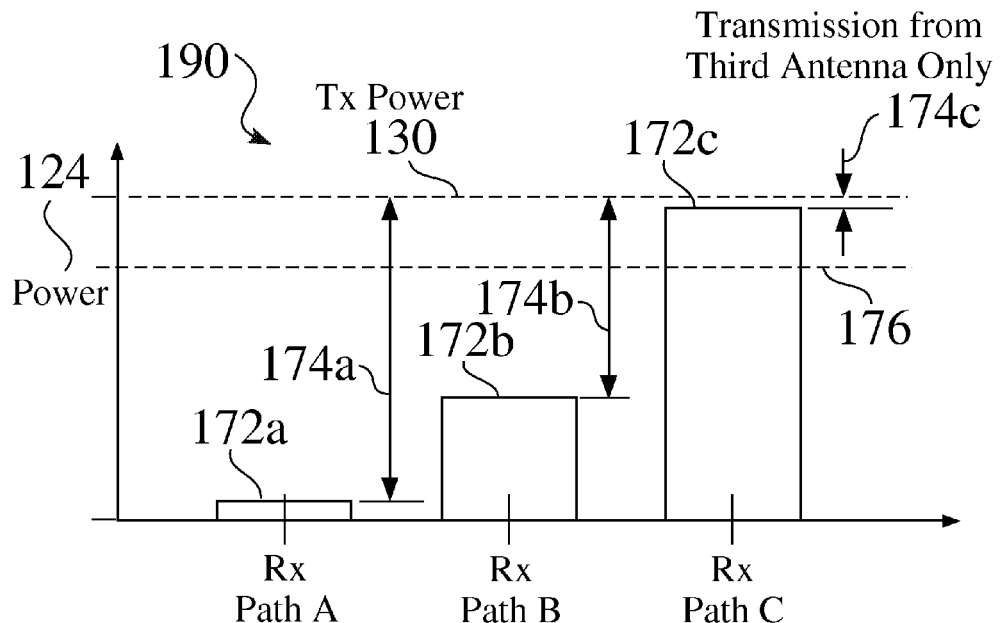
FIG. 9 shows exemplary reception of a third signal for near-field power measurement of a MIMO device.

FIG. 7 shows exemplary reception 170 of a first signal 46, e.g. 46a, for near-field power measurement of an exemplary MIMO device under test (DUT) 42, such as corresponding to a first pulse 126a in a pulse train signal 128. FIG. 8 shows exemplary reception 180 of a second signal 46, e.g. 46b, for near-field power measurement of an exemplary MIMO device under test (DUT) 42, such as corresponding to a second pulse 126b in a pulse train signal 128. FIG. 9 shows exemplary reception 190 of a third signal 46, e.g. 46c, for near-field power measurement of an exemplary MIMO device under test (DUT) 42, such as corresponding to a third pulse 126c in a pulse train signal 128.

The transmission power 130 for each corresponding DUT antenna 44 is seen in FIG. 7 to FIG. 9. For example, as seen in FIG. 7, the transmitted signal 46a corresponding to a first pulse 126a of a signal pulse train 128 is output from a first DUT antenna 44a with a transmitted power level 130. At the time the transmitted signal 46a is output from a first DUT antenna 44a, the other DUT antennas 44, e.g. 44b and 44c, are inactive.

As also seen in FIG. 7, the transmitted signal 46s is received at a corresponding antenna 110, e.g. 110a, with a measured near-field power level 172a, which corresponds to attenuation 174a. As further seen in FIG. 7, the measured near-field power level 172a is greater than a threshold level 176, which may be determined or stored by the system 100, such that the tested Tx path 54a may be determined 158 (FIG. 6) to pass the near-field performance test.

As further seen in FIG. 7, the received power level of the other neighboring Tx paths 54, e.g. 54b,54c may also be measured, such as in comparison to the near-field power of the currently tested Tx path 54a. For example, the near-field power level 172b of a second Tx path 54b (Tx Path B) may be less than a threshold level 176, such as due to attenuation 174b. Similarly, the near-field power level 172c of a third Tx path 54c (Tx Path C) may be less than a threshold level 176, such as due to attenuation 174c. Such attenuation is typically expected and determined to be acceptable, as long as the power level 172a of the primary tested Tx path 54a is determined to be acceptable 158 (FIG. 6).

FIG. 8 shows exemplary reception 180 of a second signal 46, e.g. 46b, for near-field power measurement of an exemplary MIMO device under test (DUT) 42. As seen in FIG. 8, the transmitted signal 46b corresponding to a second pulse 126b of a signal pulse train 128 is output from a second DUT antenna 44b with a transmitted power level 130. As also seen in FIG. 8, the transmitted signal 46b is received at the corresponding test antenna 110, e.g. 110b, with a measured near-field power level 172b, which corresponds to attenuation 174b. As also seen in FIG. 8, the measured near-field power level 172b is greater than a threshold level 176, which may be determined or stored by the system 100, such that the tested Tx path 54b may be determined 158 (FIG. 6) to pass the near-field performance test.

As further seen in FIG. 8, the power level of other neighboring Tx paths 54, e.g. 54a,54c, may also be measured, such as in comparison to the near-field power of the currently tested Tx path 54b. For example, the near-field power level 172a of a first Tx path 54 (Tx Path A) may be less than a threshold level 176, such as due to attenuation 174a. Similarly, the near-field power level 172c of a third Tx path 54 (Tx Path C) may be less than a threshold level 176, such as due to attenuation 174c. Such attenuation may typically be expected and determined to be acceptable, as long as the power level 172b of the currently tested Tx path 54b is determined to be acceptable 158 (FIG. 6).

FIG. 9 shows exemplary reception 190 of a third signal 46, e.g. 46c, for near-field power measurement of an exemplary MIMO device under test (DUT) 42. As seen in FIG. 9, the transmitted signal 46c corresponding to a third pulse 126c of a signal pulse train 128 is output from a third DUT antenna 44c with a transmitted power level 130. As also seen in FIG. 9, the transmitted signal 46c is received at the corresponding third test antenna 110c, with a measured near-field power level 172c, which corresponds to attenuation 174c. As also seen in FIG. 9, the measured near-field power level 172c is greater than a threshold level 176, which may be determined or stored by the system 100, such that the tested Tx path 54c may be determined 158 (FIG. 6) to pass the near-field performance test.

As further seen in FIG. 9, the power level of other neighboring Tx paths 54, e.g. 54a,54b, may also be measured, such as in comparison to the near-field power of the currently tested Tx path 54c. For example, the near-field power level 172a of a first Tx path 54a (Tx Path A) may be less than the threshold level 176, such as due to attenuation 174a. Similarly, the near-field power level 172b of the second Tx path 54b (Tx Path B) may also be less than the threshold level 176, such as due to attenuation 174b. Such attenuation may typically be expected and determined to be acceptable, as long as the power level 172c of the currently tested Tx path 54c is determined to be acceptable 158 (FIG. 6).

Figure 10:
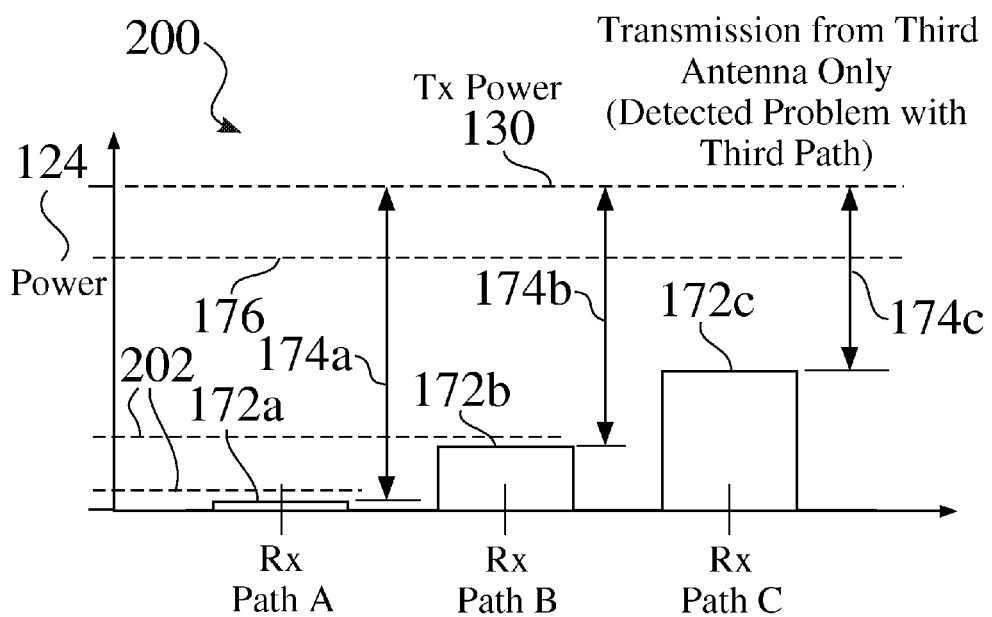
FIG. 10 shows a problematic reception of a third signal that was transmitted from a MIMO device, based on a power level that is too low or missing.

FIG. 10 shows an exemplary reception 200 of a third signal 46, e.g. 46c, for near-field power measurement of an alternate MIMO device under test (DUT) 42, which reflects a near-field MIMO power level 172, e.g. 172c, that is too low or missing. For example, as seen in FIG. 10, the transmitted signal 46c corresponding to a third pulse 126c of a signal pulse train 128 is output from a third DUT antenna 44c with a transmitted power level 130. As also seen in FIG. 10, the transmitted signal 46c is received at the corresponding test antenna 110, e.g. 110c, with a measured near-field power level 172c, which corresponds to attenuation 174c. As also seen in FIG. 10, the measured near-field power level 172c is less than a threshold level 176, which may be determined or stored by the system 100, such that the tested Tx path 54c may be determined 152 (FIG. 8) to fail the near-field power measurement test.

As further seen in FIG. 10, the power level of other neighboring Tx paths 54, e.g. 54a,54b, may also be measured, such as in comparison to the near-field power of the currently tested Tx path 54c. The near-field power level 172a of the first Tx path 54a (Tx Path A) seen in FIG. 10 is also less than the threshold level 176, such as due to attenuation 174a. Similarly, the near-field power level 172b of the second Tx path 54b (Tx Path B) seen in FIG. 10 is less than the threshold level 176, such as due to attenuation 174b. As the power level 172c of the currently tested Tx path 54c is determined to be unacceptable 152, the additional attenuation of the secondary, i.e. neighboring Tx paths 54, 54a,54b, may provide further confirmation of the failure, and may provide additional information, such as for DUT troubleshooting. As also seen in FIG. 9 and FIG. 10, the increased attenuation measured at the secondary Tx paths 54, e.g. 54a,54b, may be compared with one or more secondary thresholds 202, such as to indicate whether or not the secondary Tx paths may compensate for a fault in a primary Tx path, e.g. 54c.

Figure 11:
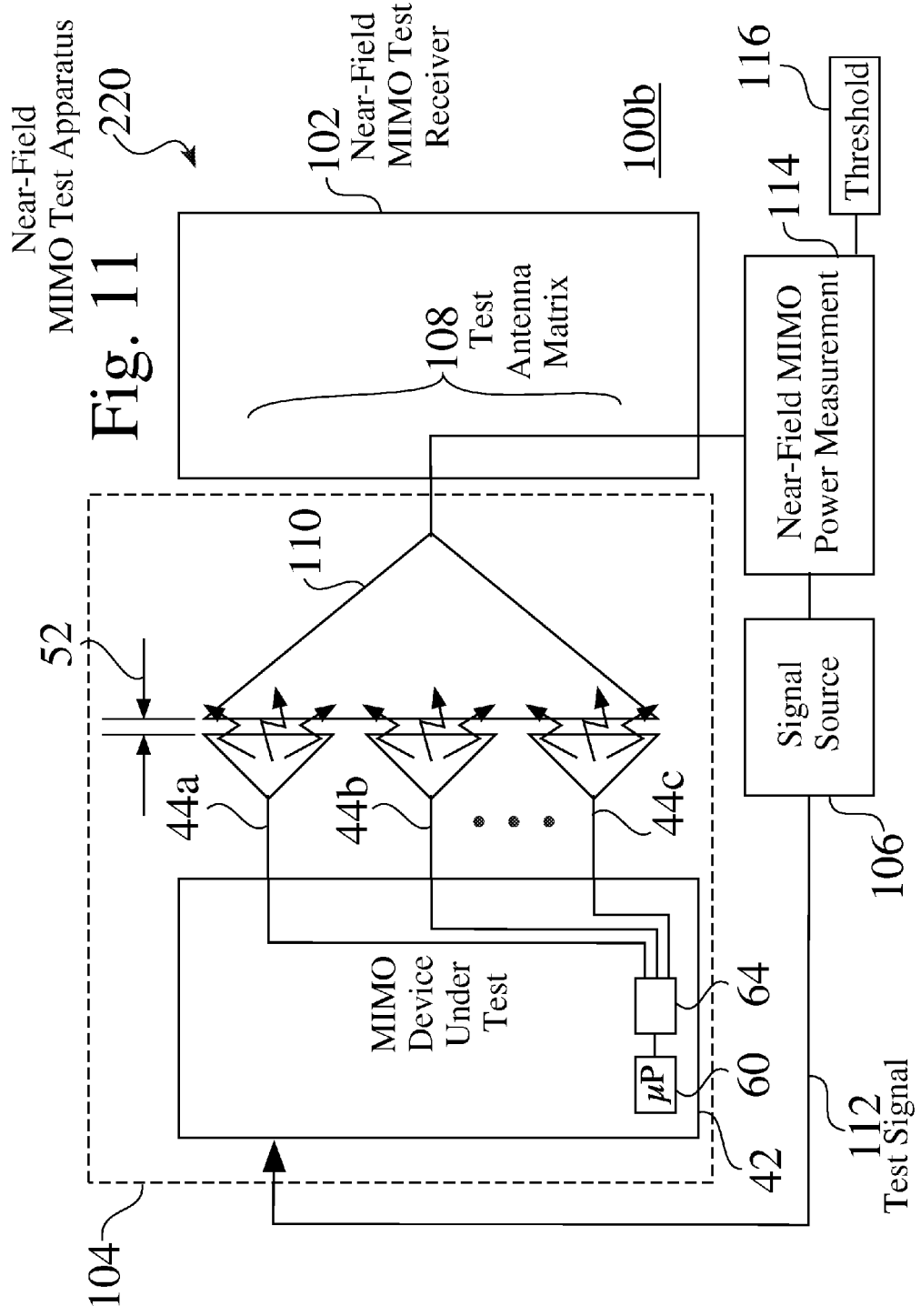
FIG. 11 is a simplified schematic view of an alternate embodiment of a power measurement apparatus for measuring the output power of a MIMO device.

FIG. 11 is a simplified schematic view 220 of an alternate power measurement system 100, e.g. 100b, for measuring the output power of an exemplary multiple input multiple output (MIMO) wireless communications device under test (DUT), e.g. 42.

As seen in FIG. 11, an exemplary multiple input multiple output (MIMO) device 42 may be placed within a DUT test region 104, such as in relation to a test chamber 302 (FIG. 12), and positioned such that the MIMO antennas 44, e.g. 44a-44c, are closely aligned and spaced 52, e.g. 52a-52c, with respect to a single corresponding MIMO test antenna 110, which is connected to a near-field MIMO test receiver 102. In a current embodiment of the test system 100, the antennas 44a-44c of the MIMO device under test 42 are spaced 52, e.g. 52a-52c, within about 10 mm from the test antennas 110.

A test signal 112 is fed into the MIMO DUT 12, wherein the MIMO test signal 112 may comprise a pulse train signal 128 (FIG. 5), having a plurality of signal pulses 126, e.g. 126a-126c, such as corresponding to each of the MIMO Tx paths 54, e.g. 54a-54c, and antennas 44, e.g. 44a-44c, to be tested. The test signal 112 is processed through the MIMO DUT 42, wherein corresponding portions, e.g. 126a, 126b, or 126c, are steered and sequentially transmitted 46 from a one of the DUT antennas 44a-44c. For example, a corresponding portion, e.g. a first pulse 126a may preferably be transmitted from a first antenna 44a at a first time 122a, a second pulse 126b may preferably be transmitted from a second antenna 44b at a second time 122b, and a third pulse 126c may preferably be transmitted from a third antenna 44c at a third time 122c.

The transmitted MIMO signals 44a,44b,44c are received through the test antenna 110 and the near-field MIMO test receiver 102, wherein the power of the received signals 443 is measured 114, for each of the MIMO Tx paths 54, e.g. 54a-54c. Based upon the near-field reception of each of the transmitted signals 44, e.g. 44a, or not, and/or the measured power 114, such as compared to a threshold level 116, the MIMO DUT 42 is either passed 158, e.g. if the signal is received and the power level 114 meets or exceeds an acceptable threshold level 116, or failed 152, e.g. if the signal is not received, or is received, but the power level 114 falls below the acceptable threshold level 116. The near-field power 124 (FIG. 5) of the MIMO device under test (DUT) 42 is therefore measured, such as to determine if there are problems within the MIMO DUT 42.

Near-field power measurement testing can be quickly and efficiently performed to determine a wide range of possible problems in MIMO devices 42, which may otherwise be overlooked in other system-wide tests that may otherwise mask such problems, for example, if a test system or other operating environment compensates for path losses of about 10 to 20 dB.

In the alternate system 100b seen in FIG. 11, a single antenna 110 is configured to adequately receive the transmissions 46 from each of the antennas 44, e.g. 44a-44c. The alternate system 100b may also preferably compensate for near-field attenuation.

The near-field MIMO power measurement system 100, e.g. 100a,100a, therefore readily provides efficient testing of MIMO devices, such as to readily detect faults in one or more Tx paths 54 of the MIMO devices. As the tests are inherently performed in a near-field environment, the requirements of the test region 104a are minimized. Furthermore, the testing of all Tx paths 54 of a typical 3×3 or 4×4 MIMO device 42 may readily be performed in less than one minute. In stark contrast to the near-field MIMO power measurement system 100, the time required to test all near-field and far field points for such a MIMO device may require at least 5 to 10 minutes. Therefore, the near-field MIMO power measurement system 100 provides a great value, particularly within a high-volume production environment.

Figure 12:
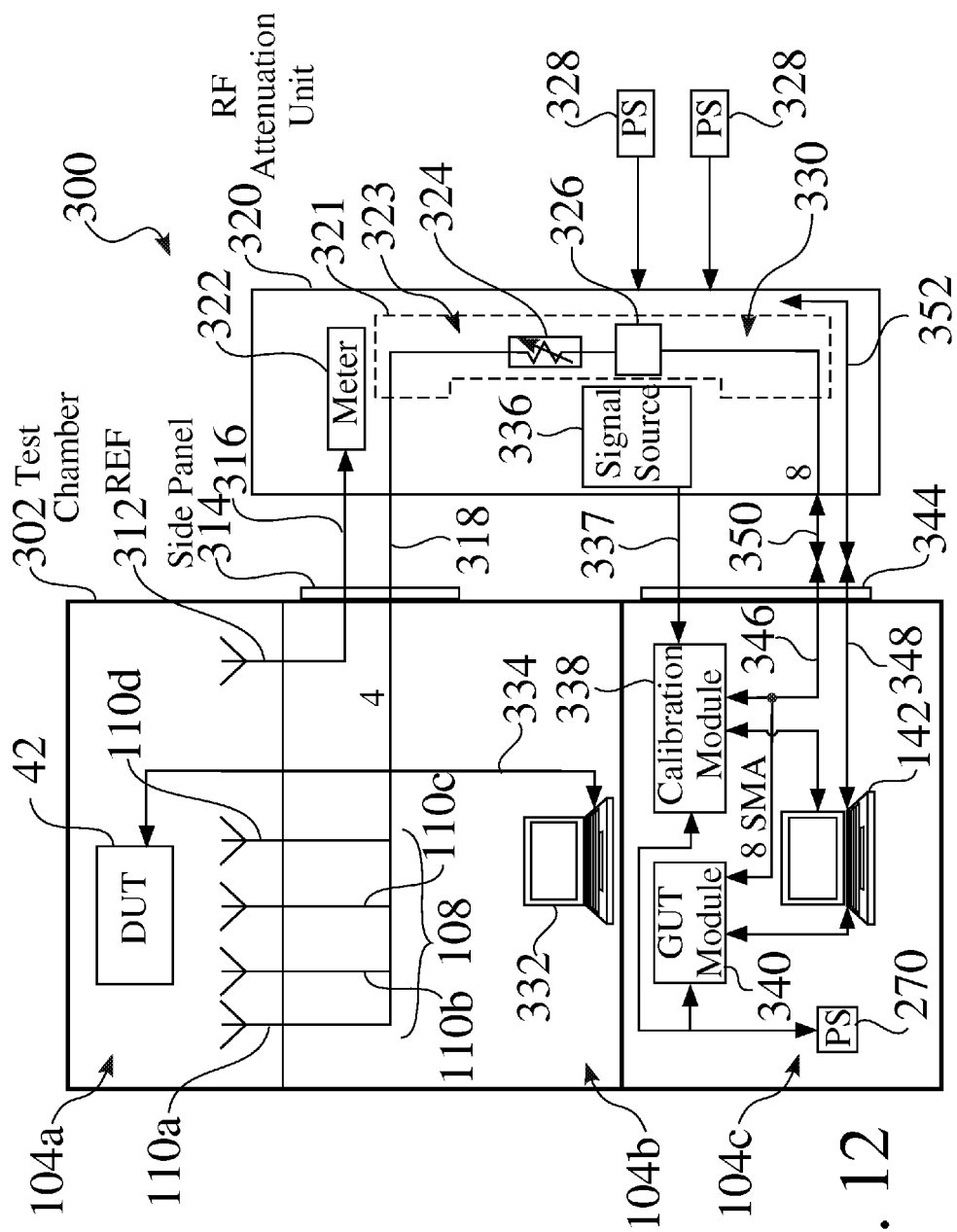
FIG. 12 is a schematic view of an exemplary enhanced near-field MIMO wireless test system.

FIG. 12 is a schematic view of an exemplary enhanced near-field MIMO wireless test system 300, which may be configured as a near-field MIMO power measurement test system 100, or may be used in conjunction with a near-field MIMO power measurement test system 100. A test chamber 302 comprises a first region 104a, a second region 104b, and a third region 104c. A device under test (DUT) 42 is locatable within the first test region 104a. The first test region 104a may preferably comprise RF shielding, e.g. such as but not limited to any of double-walled steel, mesh, fabric, paint, and/or foam.

In some embodiments, the near-field MIMO wireless test system 300 may comprise the same structure as the near-field MIMO power measurement system 100, while in other near-field MIMO wireless test systems 300, the test structure may comprise a different structure than the near-field MIMO power measurement system 100.

The enhanced near-field MIMO wireless test system 300 provides a standard system and emulation model to adequately test the performance of MIMO devices 42, both for near-field performance and far-field performance. For example, in some embodiments 300, far-field performance of a MIMO device 46 may preferably be emulated within a near-field MIMO test system 300. The enhanced near-field MIMO wireless test system 300 may preferably be configured for near-field MIMO power measurement testing 140.

An antenna matrix 108 comprises one or more test antennas 110, e.g. 110a-110d, which are located in and extend 318 from the first test chamber 104a. The antenna matrix 108 is connected 318 to an RF attenuation unit 320. Furthermore, a reference antenna (REF) 312 is located in and extends 316 from the first test region 104a, and is then connected to meter 322 within the RF attenuation unit 320. In a current system embodiment, the meter 322 comprises an RF & Microwave power meter 322, which provides simultaneously scanning multichannel measurement, for self-calibration of the enhanced near-field MIMO wireless test system 300.

Each of the antennas 110, e.g. 110a-110d, in the antenna matrix 108 preferably comprises a time division duplexing (TDD) antenna 110, which applies time-division multiplexing, e.g. such as to separate outward (uplink) signals 46 and return (downlink) signals 46.

For example, in a four-by-four setup, each DUT 42 comprises four time-division multiplexed (TDM) antennas 44, wherein each of the device antennas 44a-44d is configured to both transmit uplink signals 46 and receive combined downlink signals 46. For such a four-by-four configuration, to test the MIMO performance of the DUTs 46, each of the four test antennas 110a-110d in the test system 300 is configured to both receive combined uplink signals 46, and transmit downlink signals 46, which are preferably attenuated and combined to simulate one or more distances 52 between the test antennas 110 and the device antennas 44a-44d. The test antennas 110a-110d comprise part of the test system 300, and typically comprise standard MIMO antennas inside the DUT test region 104a.

The antenna matrix 108 provides input paths 318 (FIG. 14), e.g. four paths 318a-318d for a 4×4 DUT 42 and a 4×4 MIMO test system 300, that are connected to a signal processing circuit 321, such as through an input signal processing assembly 323, wherein the signal processing circuit 321 comprises a programmable attenuator assembly 324.

The programmable attenuator assembly 324 typically comprises a plurality of programmable attenuators, e.g. 324a-324d (FIG. 13, FIG. 14), corresponding to each of a plurality of antenna paths 318.

Each of the programmable attenuators 324 is configured to simulate real-world distance for each of the plurality of antenna paths 318a-318d. For example, on a current MIMO test system embodiment 300, the programmable attenuators 324 may preferably be configured for any distance from zero meters to one or more kilometers.

The programmable attenuator 324 are connected to at least one Butler matrix 326, which is configured to combine the plurality of MIMO signals, to emulate one or more real-world conditions, e.g. emulating the combined MIMO signal for a plurality of distances 52. Some system embodiments 300 are configured to provide selectable switching between Butler matrix blocks 326, such as between a 2.4 gigahertz block 326a (FIG. 13, FIG. 14) and a 5 gigahertz block 326b (FIG. 13, FIG. 14) and a through or identical path where there is no Butler matrix in the path.

The system 300 is therefore preferably configured to adjust the attenuation, which simulates the distance 52, e.g. 52a, 52b, between the device under test 42 and the test antennas 110. The attenuation may preferably be programmed digitally, and may preferably be varied, such as independently or in tandem.

The output of the Butler matrix assembly 326 is connected, such as through an output signal processing assembly 330, to an output port 436 (FIG. 13), which is connectable 350,346 to a calibration module 338, or to a GUT module 340, such as located within the third test region 104c.

A continuous-wave (CW) signal source 336, such as located in the RF attenuation unit 320, is also connectable 337 to the calibration module 338. In some current system embodiments 300, an exemplary signal source 336 has a frequency range from 20 MHz to 6 GHz. For calibration, the signal source 336 is configured to generate a continuous-wave (CW) signal at desired frequency, which is pumped into the antenna matrix 318, i.e. the antenna chain 318, and then matched using the power meters 392, 322.

The exemplary test system 300 seen in FIG. 12 comprises a 4×4 QC test station 300, for testing the near field performance of a four Tx path MIMO device 42. The enhanced system 300 provides testing, within a small, i.e. near-field, form factor, while emulating a significantly larger, i.e. far-field, environment, wherein the system 300 accurately determines the performance of a DUT 42 in a real-world MIMO environment.

In the exemplary test system 300 seen in FIG. 12, one or more of the cables between components, e.g. 316, 318, 337, 346, etc. may preferably comprise coaxial RF coaxial cables, with suitable connectors, such as but not limited to SubMiniature version A (SMA) connectors. Other electrical connections, such as but not limited to signal connections between components located within the third region 104c of the test chamber 302, may comprise RJ45 wiring and connectors.

Figure 13:
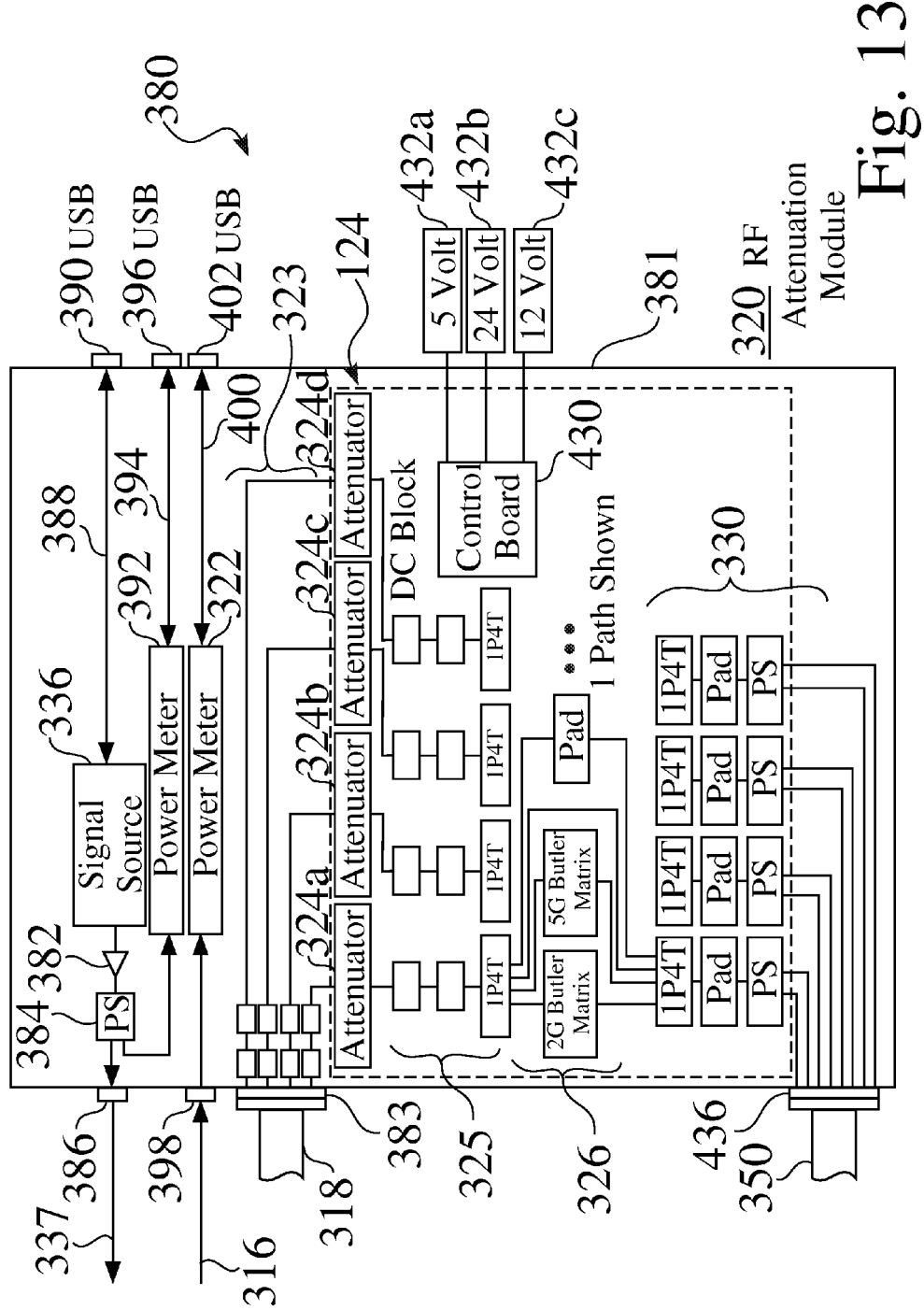
FIG. 13 is a schematic diagram of an exemplary RF attenuation unit for a near-field MIMO wireless test system.
Figure 14:
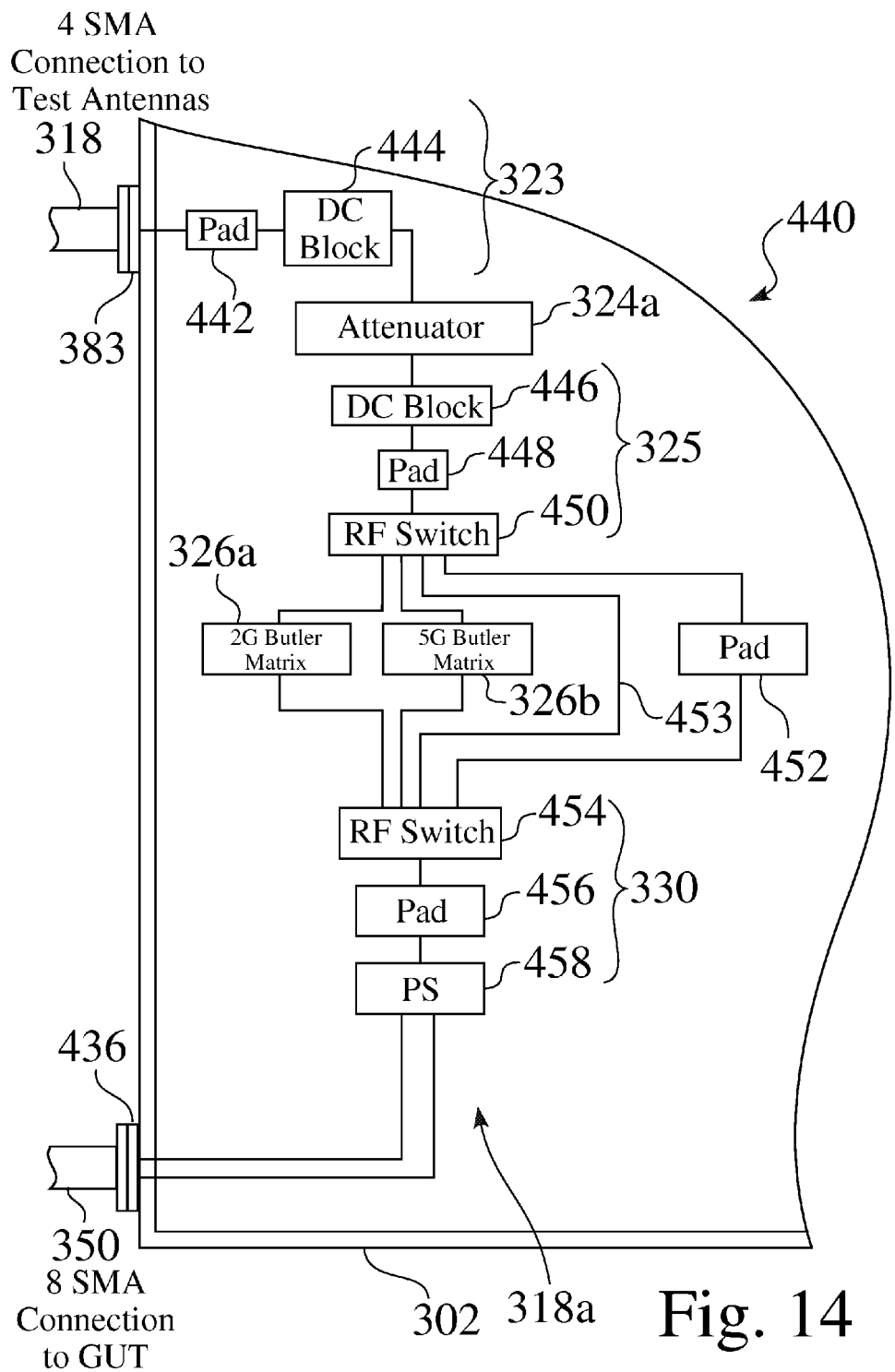
FIG. 14 is a detailed partial schematic diagram of one path within an RF attenuation unit, between an inlet port that is connectable to one or more test antennas, and an outlet port that is connectable to a Golden Unit Under Test (GUT) module.

FIG. 13 is a schematic diagram 380 of an exemplary RF attenuation unit 320, such as for a near-field MIMO wireless test system 300. The exemplary RF attenuation unit 320 seen in FIG. 13 is mounted within an enclosure 381. FIG. 14 is a detailed partial schematic diagram 440 of one path 318 within an RF attenuation unit 320, between an inlet port 383 that is connectable to the antenna matrix 108, and an outlet port 436 that is connectable to the calibration module 338 and the GUT module 340.

Figure 15:
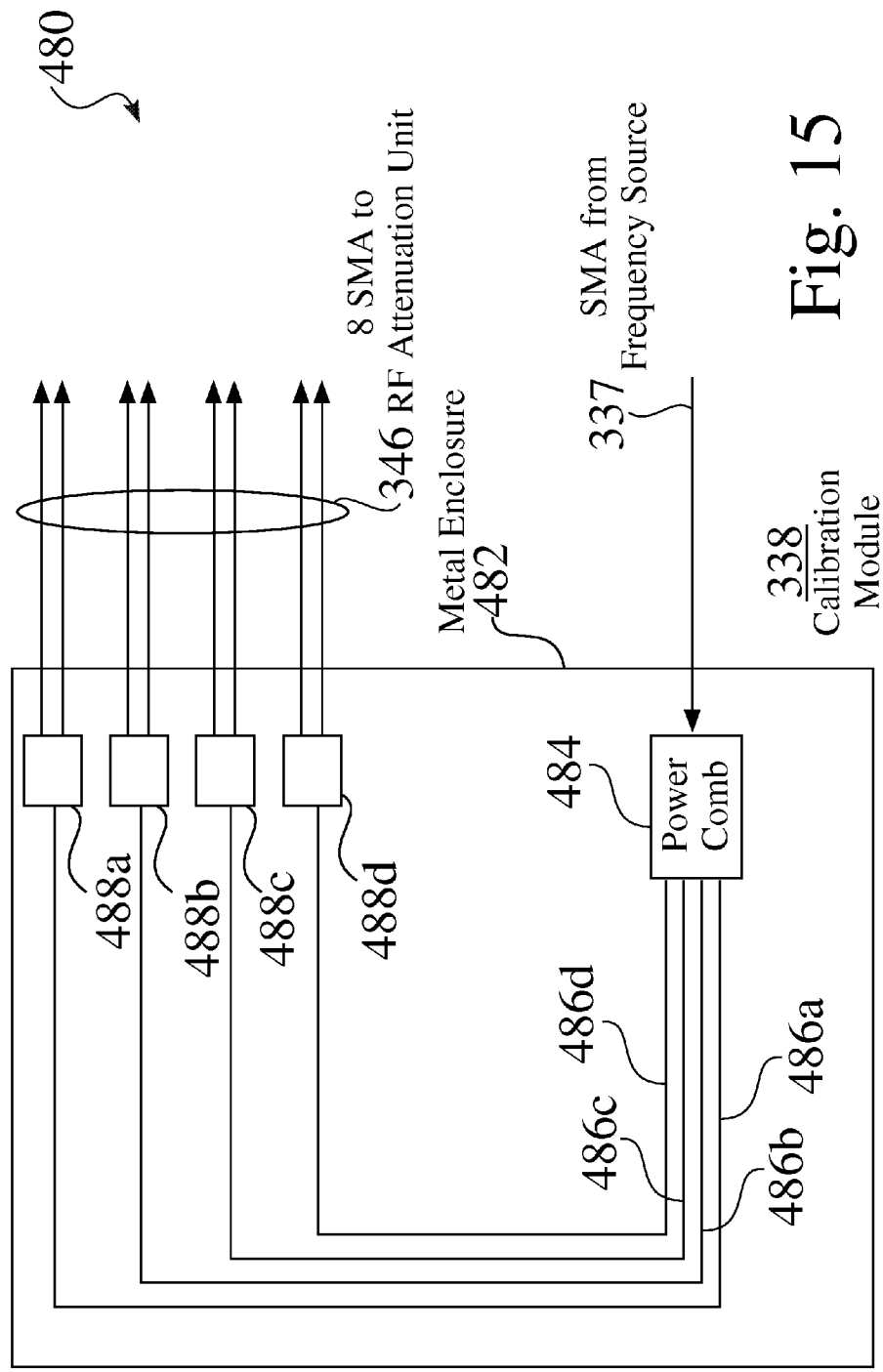
FIG. 15 is a schematic diagram of an exemplary calibration module for a near-field MIMO wireless test system.

As seen in FIG. 13, an input of the signal source 336 is connected 388 to a USB port 390. The output of the signal source 336 is connected to an RF amplifier 382, which feeds into a power splitter/combiners (PS) element 384. In a current exemplary system 300, the RF amplifier 382 comprises a wide band power amplifier 382. The PS element 384 is then connected to an output 386, which is connectable 337 to the calibration module 338 (FIG. 12,FIG. 15). The PS element 384 is also connected to a power meter 392, which is connected 394 to a corresponding USB port 396.

As also seen in FIG. 13, the reference antenna cable 316 is connectable to a reference input port 398, which is connected to a reference signal power meter 322. The reference signal power meter 322 is also connected 400 to a corresponding USB port 402. In a current system embodiment, the power meters 322 and 392 comprise RF & Microwave power meters.

The exemplary signal processing circuit 321 seen in FIG. 13 and FIG. 14 comprises an input signal processing assembly 323 between the input port 383 and the programmable attenuators 324. In some embodiments, the input signal processing assembly 323 comprises a Pad 442 and a DC block 444 corresponding to each antenna 110, e.g. 110a-110d, of the test antenna matrix 108, which are connected to a corresponding attenuator module for each signal path 318, e.g. 318a. In some current embodiments, the programmable attenuators 324, e.g. 324a-324d, comprise solid-state programmable attenuators.

The exemplary signal processing circuit 321 seen in FIG. 13 and FIG. 14 also comprises a post attenuation processing assembly 325 between the programmable attenuation elements 324, e.g. 324a, and one or more corresponding butler matrix modules 326. In some embodiments, the post attenuation processing assembly 325 comprises a DC block 446, a Pad 448, and eight RF switch elements 450. In some current embodiments, the RF switch elements 450 comprise single pole multiple throw (SPnT) RF switches.

As seen in FIG. 13 and FIG. 14, each signal path 318, e.g. 318a, in a signal processing circuit 321 may comprise one or more Butler matrix modules 326, e.g. 326a,326b. For example, a first Butler matrix module 326a seen in FIG. 14 comprises a 4×4 module for 2G operations. In an exemplary current embodiment of the RF attenuation module 320, the first Butler matrix module 326a comprises a Model BC44-30 module, available through Emhiser Tele-Tech, Incorporated, of Belgrade, Mont. As well, the second Butler matrix module 326b seen in FIG. 14 may preferably comprise a 4×4 module for 5G operation, which in one current embodiment comprises a Model BC44-31 module, also available through Emhiser Tele-Tech, Incorporated. In addition, the signal processing circuit 321 may further comprise an RF attenuation pad element 452 and/or a matrix bypass or identity connection 453.

The exemplary signal processing circuit 321 seen in FIG. 13 and FIG. 14 also comprises an output signal processing assembly 330 between the Butler Matrix assembly 326 and the output port 436, such as comprising but not limited to eight RF switch elements 454, a Pad element 456, and a PS element 458. In some current embodiments, the RF switch elements 454 comprise single pole multiple throw (SPnT) RF switches. The Pad element 456 typically comprises an RF attenuation pad, such as to reduce the level of the output signal to an acceptable level for input to any of the calibration module 338 or the GUT module 340.

The RF switch elements 450 and 454 allow the exemplary embodiment 300 seen in FIG. 13 and FIG. 14 to be controllably switched between modules in the Butler Matrix Assembly 326, e.g. between any of the first Butler matrix module 326a, the second Butler matrix module 326b, the RF attenuation pad element 452, or the matrix bypass connection 453, for each of the antenna paths 318.

As further seen in FIG. 13, the RF attenuation module 320 further comprises a control board 430, having one or more power inputs 432, e.g. a 5 volt DC supply 432a, a 24 volt DC supply 432b, and/or a 12 volt DC supply 432c. The control board 430 controls several modules within the RF attenuation module 320, such as comprising any of the relays, the programmable attenuators 324, and any switching that is required between components and paths 318.

In some system embodiments 300, the control board 430 is configured to provide selectable switching between Butler matrix blocks 326, such as between a 2.4 gigahertz block 326a (FIG. 13, FIG. 14) and a 5 gigahertz block 326b (FIG. 13, FIG. 14). As well, the control board 430 may preferably be configured to provide simultaneous operation at a plurality of frequencies, e.g. simultaneous 2.4 gigahertz and 5 gigahertz operation.

FIG. 15 is a schematic diagram 480 of an exemplary calibration module 338 for a near-field MIMO wireless test system 300, which typically comprises a metal enclosure 482. A 4-Way power divider 484, i.e. a power comb 484, is mounted within the enclosure 482, and is connected 337 to the signal source 336 at the RF attenuation module 320. In an exemplary current system embodiment 300, the 4-Way Power Divider 484 comprises an RF power divider/combiner, which is rated at a frequency range of 2 GHz to 8 GHz. Outputs 486, e.g. 486a-486d for a 4×4 system 300, extend from the power divider 484 to corresponding splitter/combiner modules 488, e.g. 488a-488d. In a current system embodiment 300, the splitter/combiner modules 488a-488d comprise RF power divider/combiners.

The calibration module 338 allows automated calibration for the enhanced test system 300, using a known sample signal from the frequency source 336. The known signal is transmitted 346,350 into all four paths 318, e.g. 318a-318d, via the power comb 484 and splitter/combiners 488. The RF switches 450 and 454 (FIG. 14) are then controlled, to deactivate or turn off all but one of the paths 318. For example, three paths 318b-318d are turned "OFF", to terminate the corresponding signals, while the remaining path 318a is turned "ON". The chosen "ON" path 318, e.g. 318a, carries the signal from the frequency source 336, through the switches 450, the Butler matrix 326, the pads 448, the corresponding attenuator 324, e.g. 324a, and up to the corresponding antenna 110, e.g. 110a, in the test chamber 104a.

Using the power meter 392 (FIG. 13), the signal is measured at the source going into 337 the calibration module 338. Using the same power meter 392, or a second power meter 322, the signal is measured at the reference antenna 312 in the test chamber 104a. These two measurements, when added, supply the path loss for the tested path 318, e.g. 318a. As the signal is known, the sent and received signal may be compared to the original signal, which is used as a reference.

The same process is repeated for each of the other three paths 318, e.g. 318b-318d, by varying the frequency source 336 to the desired Tx path frequency, and selecting the path 318 to be calibrated.

Figure 16:
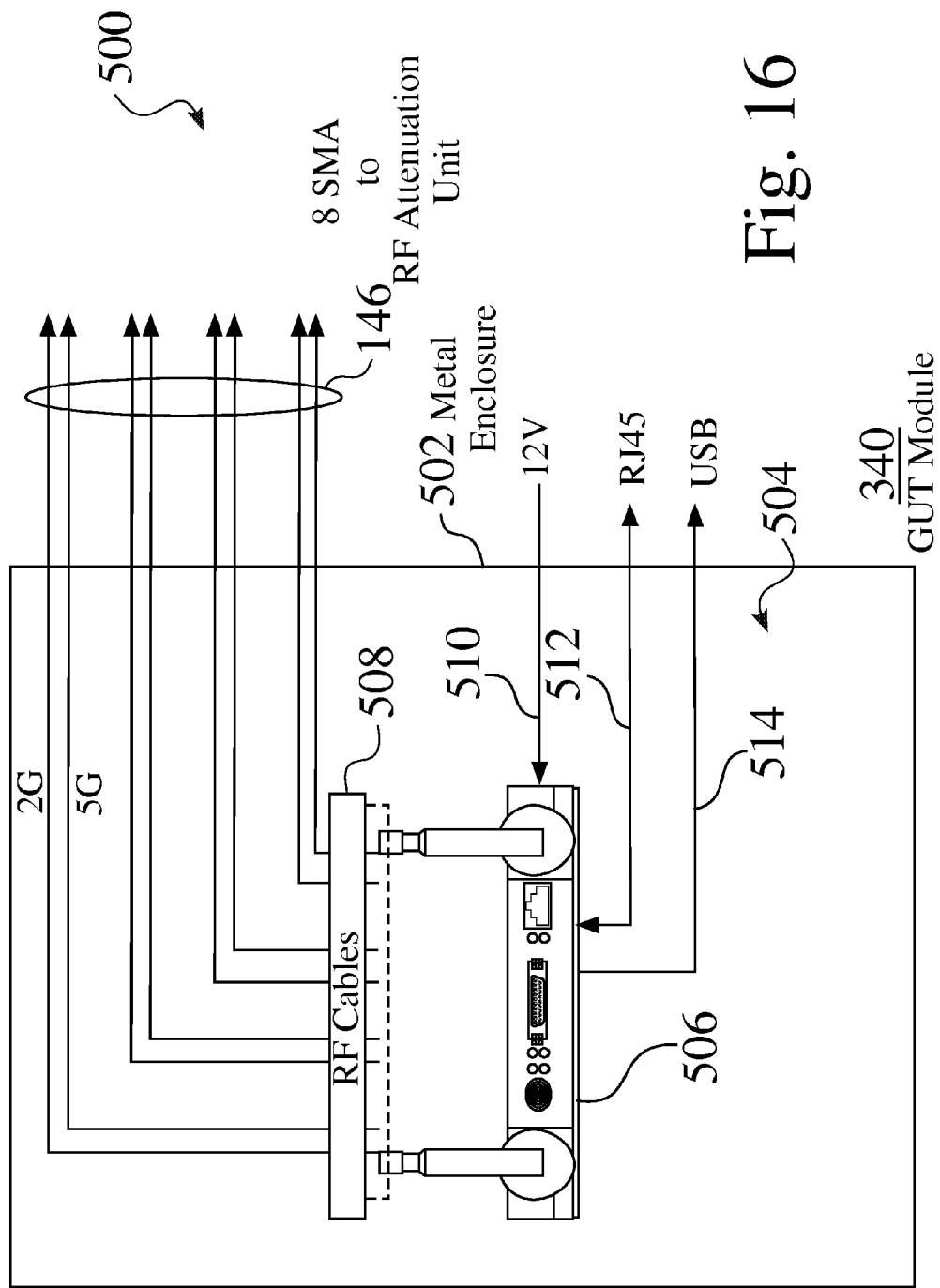
FIG. 16 is a schematic diagram of an exemplary GUT module for a near-field MIMO wireless test system.

FIG. 16 is a schematic diagram 500 of an exemplary GUT module 340 for a near-field MIMO wireless test system 300, which comprises a metal enclosure 502 having an interior region 504 defined therein. A golden unit under test (GUT) 506 comprises a wireless MIMO device 506 that is known to meet all required performance parameters, which can therefore provide a throughput mask, comprising the minimum allowed throughput in Mbps at each attenuation or range level, by which to compare the performance of a device under test 42.

As seen in FIG. 16, a golden unit under test (GUT) 506 is located within the interior region 504 of the GUT module enclosure 502. Signal cables 508 are connected to the GUT 506, such as to connect 346, e.g. through 8 SMA connectors 346, to the RF attenuation module 320. In some embodiments, the signal cables 508 comprise RF cables 508, e.g. RF interface cables. Other connections are also made to the GUT device 506, such as a power connection 510, e.g. 12 volts DC, an RJ45 connector 312, and a USB connection 514.

The enhanced MIMO test system 300 may be configured in a wide variety of sizes, such as for but not limited to testing 3×3 and/or 4×4 MIMO devices 42. For example, an enhanced MIMO test system 300 that is configured to design and/or development may have a relatively large first region 104a, such as having a volume of about 27 cubic meters, e.g. having 3 meter sides. The enhanced MIMO test system 300 can readily emulate a real-world environment, and can also compensate for differences within the test environment. Therefore, for production testing, the enhanced MIMO test system 300 may readily be configured with a smaller, i.e. near-field, form factor, such as to decrease the cost and/or complexity of the chamber.

Each of the embodiments of the enhanced MIMO test system 300 provide adequate multipart capabilities, within a physical environment having reduced interference, to maximize the performance validation for devices under test 42.

The enhanced near-field MIMO wireless test system 300 may be embodied within a relatively small form factor, which is configured to test a wide variety of MIMO devices 42 up to their maximum bandwidth, for each of a plurality of radio Tx paths 54a-54d, for downlink and/or uplink operation. The operation of the Tx paths may preferably be simultaneously excited, such that each of the transmitted signals is received properly on their destination.

The enhanced near-field MIMO wireless test system 300 is configured to operate in a near-field test environment, while emulating performance and/or providing correlation to provide results that reflect the performance of devices under test (DUT) 42 under real-world conditions. The enhanced system 300 therefore provides testing, within a small, i.e. near-field, form factor, while emulating a significantly larger, i.e. far-field, environment, wherein the system accurately determines the performance of a DUT in a real-world MIMO environment.

The enhanced near-field MIMO wireless test system 300 may preferably be configured to provide near-field testing for any of:
  product development;
  product validation; and/or
  product production and shipping, e.g. quality control.

As well, the relative form factor, i.e. size, of the near-field MIMO wireless test system 300 may suitably be adapted for the type of testing to be performed. For example, product development testing may preferably be performed in a larger test chamber, such as for but not limited to:
  larger test antennas 110;
  room for different or additional instrumentation and/or sensors;
  room for engineers and/or technicians;
  room for larger prototypes; and/or
  increased access to any of DUTs 42, antennas, 110, 322, cables, or connections.

Testing of MIMO devices 42 for product production and shipping may preferably be performed at one or more facilities, such as associated with one or more original device manufacturers (ODMs), e.g. contract manufacturers, and/or chipset vendors. The relative form factor, i.e. size, of the near-field MIMO wireless test system 300 is readily adaptable to the testing of DUTs 42 in production environments, such as at an ODM facility, wherein the space, cost and speed of testing becomes increasingly important. In such a testing environment, a small scale test chamber 302 may be used, having a relatively small DUT region 104a, wherein the near-field MIMO wireless test system 300 may readily provide performance testing over the full bandwidth of the DUTs 42, using signal emulation and data correlation to accurately reflect the downlink and/or uplink performance of DUTs 42 for different levels of path loss, i.e. reflecting DUT performance at different distances 52.

For a particular group of DUTs 42, near-scale MIMO performance tracking may preferably be performed using different test chambers 302, such as within both a larger near-scale chamber 302 and a smaller near-scale chamber 302, wherein the performance results may be compared between the different chambers 302. For example, the performance, of a known device under test DUT 42 may be compared to the performance of the same device DUT 42 within a different chamber 302, such as to confirm the suitability of a new near-scale chamber 302 for subsequent testing, e.g. 140. In some embodiments, comparisons may preferably be made between one or more data points, and/or between entire performance charts.

In another example the performance of one or more wireless MIMO DUTs 42, such as representative of a new MIMO product series, may be tested within a first, i.e. known and trusted, larger near-scale chamber 302, such as to establish baseline specifications for the product series, along with establishing acceptable tolerances for the uplink and/or downlink throughput at different levels of path loss wherein the path loss is correlated to the attenuation of the device 46 at different distances, i.e. ranges.

Thereafter, quality control testing may be performed at any of the same test system 300, or at a different test system 300, such as configured for time and cost-efficient production testing, wherein the performance of production DUTs 42 is checked and compared to one or more of the previously established values and tolerances.

Therefore, during product development, wireless MIMO devices 42 may initially be tested within a full scale chamber. At a later stage in development, or in a later stage, i.e. mass production, testing may be performed in the enhanced, i.e. small scale, test system 300, which provides improved setup, and decreased time and cost for quality control testing.

Figure 17:
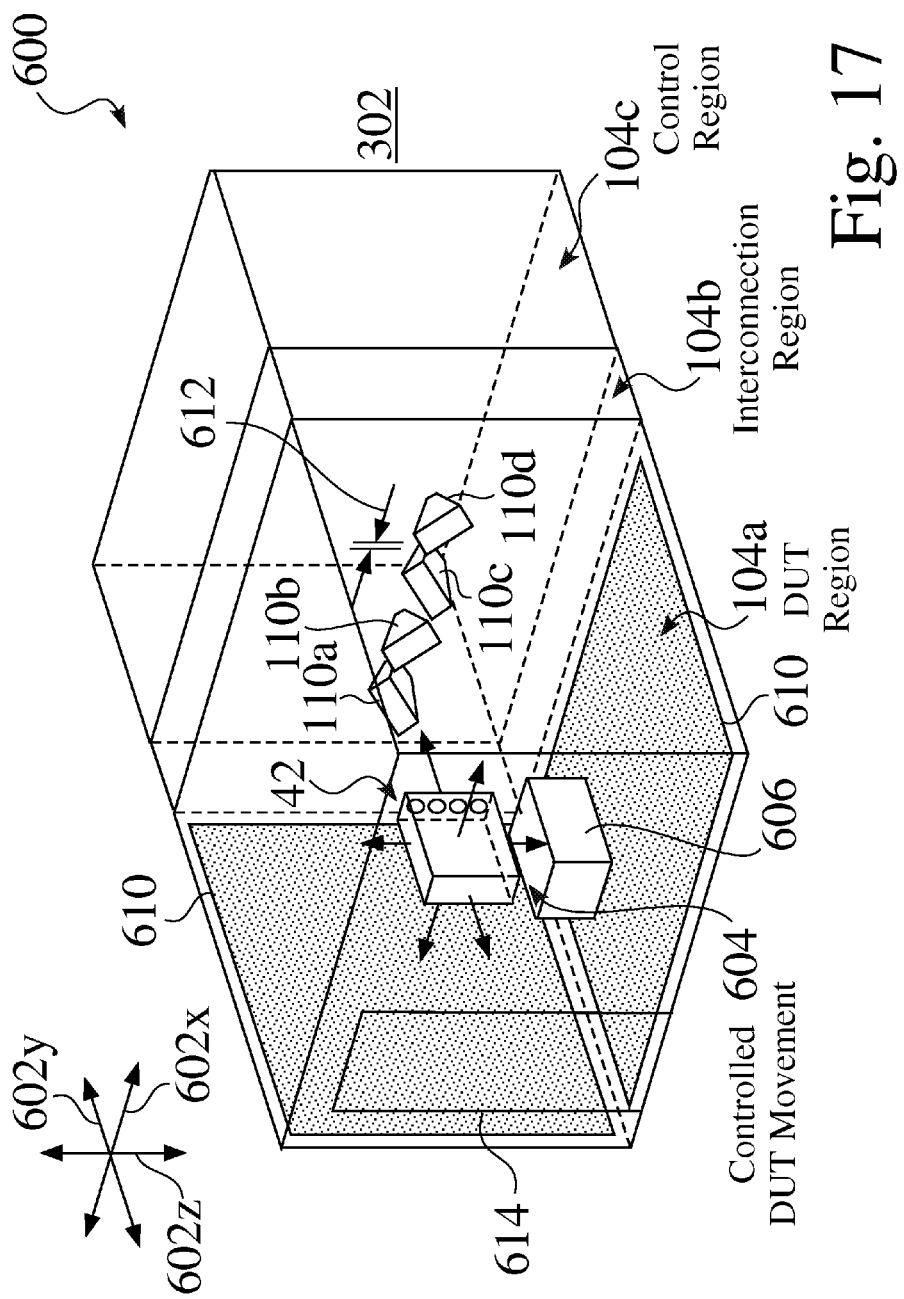
FIG. 17 is a partial cutaway view of an exemplary enhanced MIMO test chamber.

FIG. 17 is a partial cutaway view 600 of an exemplary test chamber 302 for an enhanced MIMO test system 100,300. In some embodiments of the test chamber 302, any of the DUT 42 or the matrix 108 of antennas 110, e.g. 110a-110d, are moveable 604 in relation to each other. For example, as seen in FIG. 17, a movement mechanism 606 may preferably provide controlled movement 604 of a device under test DUT 42 in one or more directions 602, e.g. such as comprising movement 604 in an X-direction 602x, in a Y-direction 602y, and/or in a Z-direction 602z.

The matrix 108 of antennas 110, e.g. 110a-110d, seen in FIG. 17 may preferably be specified based on type of testing preformed with the specific MIMO test system 100,300. For example, in a large scale system 100,300 that is configured for initial product development, the antennas 110 may be chosen with less constraints on size and/or cost, while having more constraints on desired accuracy and/or sensitivity. In a current system configured for such testing, the test antennas cost approximately $10,000 each. In contrast, for a smaller scale system, e.g. 100,300 that is configured for latter quality control, the antennas 110 may be chosen with more constraints on size and/or cost. In a current system configured for such quality control testing, the test antennas 110 cost approximately $100 each.

While some components may be chosen to reduce the cost of some enhanced test systems 100,300, such as for production testing that requires basic confirmation of performance throughput at a limited number of attenuation levels, other parts and components, such as but not limited to any of standard parts, cables, instrumentation, processors, controllers, or storage.

As seen in FIG. 17, the matrix 108 of test antennas 110a-110d comprises part of the enhanced MIMO test system 100,300 and typically comprises standard MIMO antennas inside the DUT test region 104a. The antenna connections 318 (FIG. 15), typically comprise cables, e.g. SMA cables, that extend from the DUT test region, such as directly, or through fittings, e.g. coaxial bulkhead fittings, which are connectable to one or more cable connections that extend, such as through a connection region 104, toward the RF attenuation module 320.

Similarly, devices to be tested DUT 42 are connectable, such as through fittings in the DUT test region, for any of power, as well as for input and output signal connections 334 (FIG. 12). During testing, one or more input signals 334, such as from a controller 332 (FIG. 12) are sent to the DUT 42, for the testing of processing and uplink performance. Similarly, received wireless MIMO downlink signals are received and processed by the DUT 42, wherein the resultant downlink signal 334 is transferred 334 and analyzed during the testing process.

As also seen in the FIG. 17, the matrix 108 of test antennas 110, e.g. 110a-110d, may preferably be located closely with respect to each other, such as having a consistent spacing 612 between them. In one current system embodiment 300, the antenna spacing 612 is 1 cm, which allows the antennas 110 to operate in a near-field environment 104a, while emulating any desired range in free space, from near-field to long range.

As further seen in FIG. 17, the DUT test region 104a may preferably comprise absorbing elements 610, such as to significantly reduce or eliminate reflected RF signals, such as located on all the interior surfaces of the DUT region 104, e.g. top, bottom, sides, and access door 614.

Once the DUT 42 is placed within the DUT test region 104a and connected to power and signal connections 334, the access door 614 is closed, and the system 300 powers up the DUT 42, to exercise and test the DUT 42 for all tested parameters and/or modes.

While the exemplary DUT test region 104a shown in FIG. 17, comprises a door 614, it should be understood that access 614 for the DUT test region 104a may preferably be located anywhere with respect to the inner region 104a. For example, in some system configurations 100,300 that are configured for production testing, e.g. 140, access 614 may be located on the top of the DUT region 104a, wherein a DUT 42 to be tested is lowered into the DUT region 104a, such as onto a test jig that comprises quick connections for power, input, and output signal signals, e.g. an RJ45 connector. In such a configuration, once the DUT 42 is hooked up and powered, the access door 614 is closed, and testing can begin.

As seen in FIG. 12 and FIG. 17, a large portion of the controls, hardware and connections associated with the multiple inputs and outputs (MIMO) may preferably be located away from the DUT region 104a, such as within any of the intermediate region 104b and/or the backend control region 104c. For example, the back end of the test antenna matrix 108, and the antenna cable 318 may preferably be routed through the intermediate region, such as exiting the chamber through a side panel bulkhead 314. The transmission and reception of wireless signals is intermingled, such in compliance with the real-world operation of the device under test 42, to perform near-field MIMO testing that properly reflects how the device 42 is required to operate. The design of the test structure and methods for MIMO testing is readily scalable for the different system embodiments 100,300 even within a small form factor that may be required for production testing.

The enhanced near-field MIMO wireless test systems 300 are therefore configurable to perform both uplink and downlink testing, to simulate multipath operation at different distances, for a plurality of modes and/or steps, such as to determine the throughput (megabits per second) of a device under test 42, as a function of path loss (dB).

In some system embodiments 300, such as for product development, testing may be performed over a wide range of uplink and/or downlink path loss, such all the way to the point where the throughput becomes zero. In other system embodiments 300, such as for production quality control, testing may be performed over a certain range, such as to confirm that the performance is consistent with expected pass-fail criteria within part of the range, and possibly to confirm where the throughput starts dropping off at a certain angle. Such testing may not require testing the far range, i.e. all the way to the point where the throughput becomes zero, as such testing may take too much time and fail to yield usable information for a production environment.

While some of the enhanced MIMO wireless test systems 300 are described herein for near-field testing of MIMO devices, it should be understood that many of the structures and processes may preferably be used for far-field testing of components, such as for testing antennas. For example, the enhanced wireless test system 300 may preferably be configured to provide far-field measurements, such as for passive antenna testing. Such a system 300 may preferably provide 2-dimensional plots, simulated performance, and/or elevations, such as to gain spectral efficiency from one or more antennas.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A process, comprising the steps of:
positioning a multiple input-multiple output (MIMO) device with respect to at least one test antenna, wherein the MIMO device comprises a plurality of transmission (Tx) paths, wherein each of the plurality of Tx paths has a corresponding MIMO antenna associated therewith, and wherein the MIMO device is positioned such that the MIMO antennas are located proximate the at least one test antenna for near field testing;
powering the MIMO device;
providing a pulse train signal to the MIMO device, wherein the pulse train signal comprises a corresponding pulse for each of the Tx paths; and
for each of the plurality of Tx paths, sending an uplink signal associated with the corresponding pulse from the MIMO antenna that corresponds to the currently tested Tx path, receiving the uplink signal from the corresponding MIMO antenna through the at least one test antenna, measuring the power of the received uplink signal, and
providing an output based on the measured power for the currently tested Tx path.

2. The process of claim 1, further comprising the step of:
comparing the measured power of the received uplink signal for each of the plurality of Tx paths to a threshold level;
wherein the provided output is based on the comparison.

3. The process of claim 2, wherein the threshold level comprises any of a stored threshold or a determined threshold.

4. The process of claim 2, wherein if the measured power of the received uplink signal for one or more of the plurality of Tx paths is less than the threshold level, the provided output comprises an indication that there is a problem with the MIMO device.

5. The process of claim 4, wherein the indication comprises an identification of which Tx path of the MIMO device has an output power level that is lower than the threshold level.

6. The process of claim 4, further comprising the step of:
diverting the MIMO device from a production line.

7. The process of claim 6, wherein the diversion of the MIMO device comprises diverting the device to any of a reject area or a rework area.

8. The process of claim 1, wherein the MIMO antennas are positioned within 10 mm from the at least one test antenna.

9. The process of claim 1, wherein the at least one test antenna comprises a plurality of test antennas.

10. The process of claim 8, wherein the number of the test antennas matches the number of MIMO antennas, and wherein the MIMO antennas and the test antennas are configured to provide a similar spacing between corresponding antenna pairs.

11. A system, comprising:
a test antenna matrix comprising at least one test antenna;
a MIMO test chamber configured for receiving a MIMO device in close proximity to the test antenna matrix for near field testing, wherein the MIMO device comprises a plurality of transmission (Tx) paths, wherein each of the plurality of Tx paths has a corresponding MIMO antenna associated therewith;
a mechanism for powering the MIMO device;
a mechanism for providing a series of pulses to be sequentially transmitted from individual antennas of the MIMO device;
a mechanism for receiving uplink signals through the test antenna matrix; and
at least one processor, wherein the at least one processor is configured to measure the power of the received uplink signal, and
provide an output based on the measured power for a currently tested Tx path.

12. The system of claim 11, wherein the at least one processor is further configured to compare the measured power of the received uplink signal for each of the plurality of Tx paths with a threshold level;
wherein the provided output is based on the comparison.

13. The system of claim 12, wherein the threshold level comprises any of a stored threshold or a determined threshold.

14. The system of claim 12, wherein if the measured power of the received uplink signal for one or more of the plurality of Tx paths is less than the threshold level, the provided output comprises an indication that there is a problem with the MIMO device.

15. The system of claim 14, wherein the indication comprises an identification of which Tx path of the MIMO device has an output power level that is lower than the threshold level.

16. The system of claim 14, further comprising:
a mechanism for diverting the MIMO device from a production line.

17. The system of claim 16, wherein the mechanism for diverting the MIMO device comprises any of
a mechanism for diverting the MIMO device to a reject area, or a mechanism for diverting the MIMO device to a rework area.

18. The system of claim 1, wherein the MIMO antennas are positioned within 10 mm from the at least one test antenna.

19. The system of claim 1, wherein the at least one test antenna comprises a plurality of test antennas.

20. The system of claim 19, wherein the number of the test antennas matches the number of MIMO antennas, and wherein the MIMO antennas and the test antennas are configured to provide a similar spacing between corresponding antenna pairs.

21. An apparatus, comprising:
a test antenna matrix comprising at least one test antenna;
a mechanism for receiving a MIMO device in close proximity to the at test antenna matrix for near field testing, wherein the MIMO device comprises a plurality of transmission (Tx) paths, wherein each of the plurality of Tx paths has a corresponding MIMO antenna associated therewith;
a mechanism for communicating a test signal to the MIMO device;
a mechanism for individually steering a portion for the test signal to an individual Tx path of the MIMO device, wherein the steered portion is separately transmitted from the individual Tx path through the corresponding MIMO antenna;
a mechanism for receiving the transmitted portion of the steered test signal through the test antenna matrix; and
at least one processor, wherein the at least one processor is configured to measure the power of the received transmitted portion of the steered test signal, and provide an output based on the measured power for the received transmitted portion of the steered test signal.

22. The apparatus of claim 21, wherein the at least one processor is further configured to compare the measured power of the received transmitted portion of the steered test signal with a threshold level;
wherein the provided output is based on the comparison.

23. The apparatus of claim 22, wherein the threshold level comprises any of a stored threshold or a determined threshold.

24. The apparatus of claim 22, wherein if the measured power of the received transmitted portion of the steered test signal is less than the threshold level, the provided output comprises an indication that there is a problem with the MIMO device.

* * * * *